United States Patent
Cabral et al.

(10) Patent No.: US 11,829,253 B2
(45) Date of Patent: Nov. 28, 2023

(54) SYSTEMS AND METHODS FOR NON-BLOCKING BACKUPS

(71) Applicants: Alyson Cabral, New York, NY (US); Spencer Jackson, White Plains, NY (US); Xiangyu Yao, New York, NY (US); Jonathan Reams, New York, NY (US); Daniel William Gottlieb, Long Island City, NY (US); Eliot Horowitz, New York, NY (US); Susan LoVerso, Southborough, MA (US)

(72) Inventors: Alyson Cabral, New York, NY (US); Spencer Jackson, White Plains, NY (US); Xiangyu Yao, New York, NY (US); Jonathan Reams, New York, NY (US); Daniel William Gottlieb, Long Island City, NY (US); Eliot Horowitz, New York, NY (US); Susan LoVerso, Southborough, MA (US)

(73) Assignee: MongoDB, Inc., New York, NY (US)

( * ) Notice: Subject to any disclaimer, the term of this patent is extended or adjusted under 35 U.S.C. 154(b) by 172 days.

(21) Appl. No.: 16/895,601

(22) Filed: Jun. 8, 2020

(65) Prior Publication Data
US 2020/0301787 A1   Sep. 24, 2020

Related U.S. Application Data

(63) Continuation-in-part of application No. 15/604,856, filed on May 25, 2017, now Pat. No. 10,846,411, (Continued)

(51) Int. Cl.
G06F 16/00 (2019.01)
G06F 11/14 (2006.01)
G06F 9/50 (2006.01)

(52) U.S. Cl.
CPC ........ *G06F 11/1464* (2013.01); *G06F 9/5016* (2013.01); *G06F 11/1451* (2013.01);
(Continued)

(58) Field of Classification Search
CPC ............... G06F 11/1464; G06F 9/5016; G06F 11/1451; G06F 11/1461; G06F 11/1469; G06F 2201/80
See application file for complete search history.

(56) References Cited

U.S. PATENT DOCUMENTS

| | | | |
|---|---|---|---|
| 8,074,035 B1 * | 12/2011 | Per ...................... | G06F 11/1458 707/610 |
| 10,044,801 B1 * | 8/2018 | Tyurumov .......... | H04L 67/1095 |
| 2015/0248335 A1 * | 9/2015 | Young ................. | G06F 11/1451 707/654 |

* cited by examiner

*Primary Examiner* — Hung Q Pham
(74) *Attorney, Agent, or Firm* — Wolf, Greenfield & Sacks, P.C.

(57) ABSTRACT

A database system comprising a database comprising a plurality of data storage nodes, the plurality of data storage nodes including a primary storage node and a plurality of secondary storage nodes. The database system may also include at least one processor configured to: perform at least one write command to a secondary storage node of the plurality of secondary storage nodes; and perform at least one backup command, at least partially in parallel with the at least one write command being performed to the secondary storage node, of at least some data from a snapshot of data stored in the secondary storage node. A method for performing at least one backup command in a database at least partially in parallel with the at least one write command being performed.

12 Claims, 15 Drawing Sheets

Related U.S. Application Data which is a continuation-in-part of application No. 14/992,225, filed on Jan. 11, 2016, now Pat. No. 10,262,050.

(60) Provisional application No. 62/861,968, filed on Jun. 14, 2019, provisional application No. 62/343,440, filed on May 31, 2016, provisional application No. 62/341,453, filed on May 25, 2016, provisional application No. 62/232,979, filed on Sep. 25, 2015.

(52) U.S. Cl.
CPC ...... *G06F 11/1461* (2013.01); *G06F 11/1469* (2013.01); *G06F 2201/80* (2013.01)

| Field Contents | C++ Type | WT Type |
|---|---|---|
| Key ID (database name) - primary key | string | S |
| Key data | vector<unit8_t> | u |
| Status | unit32_t | L |
| Initialization count (32-bit IV portion) | unit32_t | L |

FIG. 10A

| Field Contents | C++ Type | WT Type |
|---|---|---|
| Key ID (increases by 1 for every key) - primary key | uint32_t | L |
| Database name | string | S |
| Rollover ID (increases by 1 for every rollover) | int32_t | L |
| Key data | vector<uint8_t> | u |
| Status | uint32_t | L |
| Initialization count (32-bit IV portion) | uint32_t | L |

FIG. 10B

| Initialization count (from key store, incremented once per process start) | uint32_t |
|---|---|
| Invocation count (incremented once per call to encrypt) | uint64_t |
| Cipher text | vector<uint8_t> |

FIG. 10C

| | |
|---|---|
| std::numeric_limits<uint32_t>::max() | uint32_t |
| Version byte (currently hardcoded to 1)* | uint8_t |
| Key ID (refers to Key ID in version one keystore)* | uint64_t |
| Invocation count (from key store, incremented once per process start) | uint32_t |
| Invocation count (starts at zero on process restart, incremented once per call to encrypt) | uint64_t |
| Cipher text | vector<uint8_t> |

FIG. 10D

SYSTEMS AND METHODS FOR NON-BLOCKING BACKUPS

CROSS-REFERENCE TO RELATED APPLICATIONS

This application claims priority under 35 U.S.C. § 119(e) to U.S. Provisional Application Ser. No. 62/861,968, entitled "SYSTEMS AND METHODS FOR NON-BLOCKING BACKUPS," filed on Jun. 14, 2019, and is a continuation-in-part of U.S. patent application Ser. No. 15/604,856, entitled "DISTRIBUTED DATABASE SYSTEMS AND METHODS WITH ENCRYPTED STORAGE ENGINES," filed on May 25, 2017, each of which is herein incorporated by reference in its entirety. Application Ser. No. 15/604,856 claims priority under 35 U.S.C. § 119(e) to U.S. Provisional Application Ser. No. 62/343,440, entitled "SYSTEMS AND METHODS FOR HIERARCHICAL KEY MANAGEMENT IN ENCRYPTED DISTRIBUTED DATABASES" filed on May 31, 2016, which is herein incorporated by reference in its entirety. Application Ser. No. 15/604,856 claims priority under 35 U.S.C. § 119(e) to U.S. Provisional Application Ser. No. 62/341,453, entitled "SYSTEMS AND METHODS FOR KEY MANAGEMENT IN ENCRYPTED DISTRIBUTED DATABASES" filed on May 25, 2016, which is herein incorporated by reference in its entirety. Application Ser. No. 15/604,856 is a continuation-in-part of U.S. application Ser. No. 14/992,225, entitled "DISTRIBUTED DATABASE SYSTEMS AND METHODS WITH PLUGGABLE STORAGE ENGINES" filed on Jan. 11, 2016, which is herein incorporated by reference in its entirety. Application Ser. No. 14/992,225 claims priority under 35 U.S.C. § 119(e) to U.S. Provisional Application Ser. No. 62/232,979, entitled "DISTRIBUTED DATABASE SYSTEMS AND METHODS WITH PLUGGABLE STORAGE ENGINES" filed on Sep. 25, 2015, which is herein incorporated by reference in its entirety.

BACKGROUND

Data backup is becoming increasingly important as more parties rely on electronic copies of information for important records, and data is stored by more parties, including everything from medical records to family photographs and movies.

SUMMARY

The inventors have recognized and appreciated that data clients making data backups conventionally need to allocate additional hardware (e.g., machines and disk space) outside of the established replica set, effectively creating a hidden secondary data storage node. Conventionally, data files are copied from this allocated hardware on some snapshot schedule. The inventors have recognized that data clients could avoid this need to allocate additional hardware for maintaining an up-to-date copy of data. Rather, some embodiments herein provide a database system that can perform write command(s) while performing backup command(s) of snapshot data, which may be done without allocating additional hardware. For example, the database system can perform at least one write command to a secondary storage node and perform at least one backup command, at least partially in parallel with the at least one write command being performed, of data from a snapshot of data stored in the secondary data storage node. The inventors have recognized and appreciated that such implementations may reduce the resource costs and improve the flexibility and convenience of data backups.

According to at least one aspect, a database system is provided. The database system may comprise a database comprising a plurality of data storage nodes, the plurality of data storage nodes including a primary storage node and a plurality of secondary storage nodes. The database system may also include at least one processor configured to: perform at least one write command to a secondary storage node of the plurality of secondary storage nodes; and perform at least one backup command, at least partially in parallel with the at least one write command being performed to the secondary storage node, of at least some data from a snapshot of data stored in the secondary storage node.

In some embodiments, the at least one backup command may be performed without allocating additional disk capacity beyond that in the plurality of data storage nodes.

In some embodiments, the at least one backup command may be performed without allocating additional hardware beyond that in the plurality of data storage nodes.

In some embodiments, the plurality of data storage nodes may comprise a replica set, and the at least one backup command may be performed without allocating additional disk capacity beyond that in the replica set.

In some embodiments, the at least one backup command may open a backup cursor.

In some embodiments, each backup command of the at least one backup command may open no more than one backup cursor.

In some embodiments, the at least one processor may be configured to validate whether a storage engine supports the at least one backup command.

In some embodiments, the database system may include first components that support the at least one backup command and second components that do not support the at least one backup command.

In some embodiments, the database may follow an eventual consistency model.

In some embodiments, the at least one processor may be configured to execute a plurality of system components, wherein the system components may comprise: an interface component configured to receive the at least one write command and the at least one backup command; a snapshot component configured to generate a plurality of snapshots of data stored in the secondary storage node; and a command processing component configured to apply the at least one write command and perform the at least one backup command.

According to at least one aspect, a method is provided for performing at least one backup command in a database comprising a plurality of data storage nodes including a primary storage node and a plurality of secondary storage nodes. The method may comprise: performing at least one write command to a secondary storage node of the plurality of secondary storage nodes; and performing at least one backup command, at least partially in parallel with the at least one write command being performed to the secondary storage node, of at least some data from a snapshot of data stored in the secondary storage node.

According to at least one aspect, at least one computer-readable storage medium is provided having instructions recorded thereon which, when executed by a computer, may cause the computer to perform a method for performing at least one backup command in a database comprising a plurality of data storage nodes including a primary storage node and a plurality of secondary storage nodes. The method may comprise: performing at least one write command to a secondary storage node of the plurality of secondary storage nodes; and performing at least one backup command, at least partially in parallel with the at least one write command being performed to the secondary storage node, of at least some data from a snapshot of data stored in the secondary storage node.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of aspects herein. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIGS. 10A-D are tables of example schemas and formats, according to some embodiments.

DETAILED DESCRIPTION

The inventors have recognized and appreciated that allocating additional hardware (e.g., machines and disk space) outside of the established replica set, as in conventional data backups, is a significant resource cost, as is keeping backup cursors open during data backups. Some embodiments herein provide a database system that can reduce resource costs and improve the flexibility and convenience of data backups by performing write command(s) while performing backup command(s) of snapshot data at least partially in parallel, which may be done without allocating additional hardware.

According to some embodiments, systems and methods are provided for backing up from storage nodes in a database while simultaneously processing writes. In some embodiments, the database may follow an eventual consistency model and committed data may be data that has been replicated by more than a predetermined number of secondary nodes (e.g., half the secondary nodes) in the database. In these embodiments, data may be replicated from a primary node in the database to secondary nodes in the database over time. Thereby, one or more of the secondary nodes may have data that is not completely up-to-date relative to the primary node. Some systems described herein according to some embodiments may provide clients an ability to backup from a secondary node while data is being replicated from the primary node to the secondary node.

Conventionally, a database following an eventual consistency model is designed such that when you have sequences of writes on the primary node, each of the secondary nodes shows the sequence of writes in the same order. For example, if you change field "A" in a document and then change field "B", it is not possible to see that document with changed field "B" and not changed field "A". The sequence of writes may be applied in the same order by, for example, applying the writes in batches to secondary nodes and blocking reads to those secondary nodes so that applications cannot see data applied in the "wrong" order (e.g., an out-of-sequence order).

Figure 9:
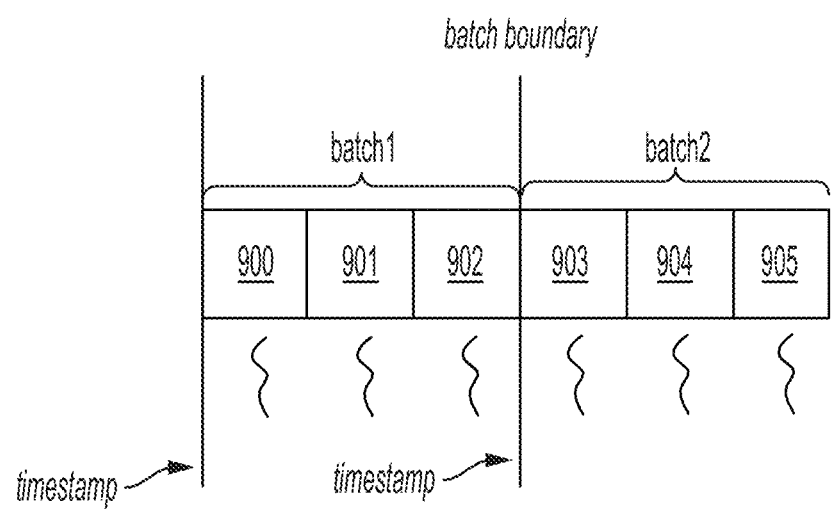
FIG. 9 is a state diagram showing an example set of batch write commands, according to some embodiments.

An example of such a batch of writes being applied to a secondary node is shown in FIG. 9. As shown, the set of six writes 900, 901, 902, 903, 904, and 905 is divided into two batches including a first batch with writes 900, 901, and 902 and a second batch with writes 903, 904, and 905. When the batches are applied to a secondary node, the individual writes within the batch may be assigned to their own processing thread so as to be applied at least partially in parallel. As a result, the writes may not complete in sequential order. For example, write 902 may be completed before write 901. Locking backup operations from a secondary node while a particular batch of writes is being applied removes the possibility of data being backed up where the writes have been processed out-of-sequence (e.g., backing up data where only writes 900 and 902 have occurred in the first batch).

According to some aspects, locking the secondary nodes during batch writes increases the amount of time to process a backup command, yielding improvements in processing over conventional approaches. For example, the backup latency is typically higher when backing up from secondary nodes while a batch of writes is being applied because the backup command must wait for the batch of writes to be applied. As the write load increases, the likelihood increases that secondary backups are subject to occasional "pauses", further impacting backup latency. Further, the write latency may also be increased because a batch of writes may not be processed against a secondary node until all of the existing backup commands have been processed to avoid changing data being retrieved in the middle of a backup command.

Accordingly, aspects of the present disclosure relate to new techniques to process backup commands against a secondary node while a batch of one or more write commands is simultaneously being applied to the secondary node (termed "non-blocking backups"). Thus, the backup latency on secondary nodes is decreased and the maximum throughput of the database is increased. In some embodiments, these techniques for non-blocking backups leverage one or more snapshots of the data in a secondary storage node. Snapshots may be representative of the state of the data in the database at a particular point in time. The snapshots may be captured periodically (or aperiodically). Thus, the snapshots present a static view of the data in the secondary storage node at a fixed point in time. Accordingly, in these embodiments, the backup commands may be processed against a snapshot of the data in the secondary storage node at a previous point in time while a batch of writes is being applied to the secondary storage node.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element, or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
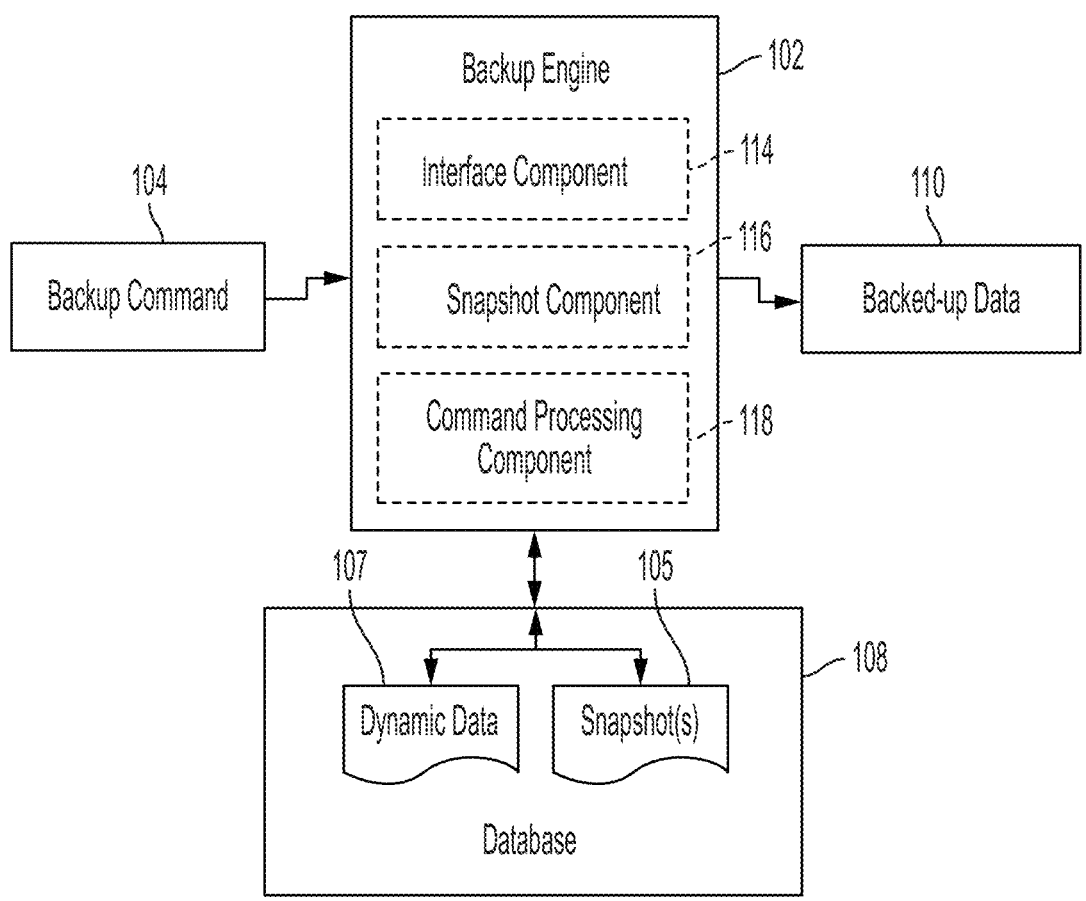
FIG. 1 is a block diagram of an example database system, according to some embodiments.

FIG. 1 shows an example database system according to some embodiments. In some embodiments, the database system may include a backup engine 102. The backup engine 102 may be designed to process various received commands on a database 108, such as a backup command 104. In some embodiments, the database 108 may include a plurality of nodes and replicate data from primary node to one or more secondary nodes. In these embodiments, the primary node may handle commands that change the data stored in the database and the secondary nodes may replicate the data in the primary node over time and process backup commands. Thereby, the secondary nodes may have data that is not completely up-to-date relative to the primary nodes. Committed data may include data that has been replicated to at least a predetermined number of secondary nodes in the database (e.g., at least half of the secondary nodes). The database 108 may store, for example, dynamic data 107 that may be modified (e.g., via a write command) and/or snapshot(s) 105 that each represent the a static view of the dynamic data 107 at a particular point in time.

In some embodiments, the backup engine 102 receives and processes backup commands 104. The backup engine 102 may process a backup command 104 by determining whether a write command is being processed against the dynamic data 107 in the database 108, backup from the dynamic data 107 responsive to a determination that the write command is not being processing against the dynamic data 107, backup from one or more snapshots 105 responsive to a determination that a write command is being processed against the dynamic data 107, and store the retrieved data 110.

As shown in FIG. 1, the backup engine 102 may include an interface component 114. The interface component may be configured to receive and provide data to various systems, such as the database 108. In some embodiments, the interface component 114 may receive the backup command 104 and provide the backed-up data 110 once the backup command 104 has been processed by the backup engine 102.

The backup engine 102 may include a snapshot component 116 to generate snapshots of data in the database 108. The snapshots are illustrative of the dynamic data 107 in the database 108 at a particular point in time. For example, the snapshot component 116 may generate a snapshot of the dynamic data 107 every 10 milliseconds and each snapshot may be representative of the data in the dynamic data 107 at the time the snapshot was taken. For example, the snapshots may be indicative of the data in a primary node and/or a secondary node at a particular point in time. Thereby, the snapshots generated by the snapshot component 116 may provide a different view of the data in the dynamic data 107 that illustrates changes over time, and/or from node to node.

The backup commands 104 may be processed by a command processing component 118 of the backup engine 102 (such as one or more processors). In some embodiments, the command processing component 118 may process backup commands 104 by determining whether the dynamic data 107 is being modified (e.g., data is being written to the dynamic data 107). If the command processing component 118 determines that the dynamic data 107 is being modified, the command processing component 118 may process the backup against one or more snapshots 105 to ensure that the retrieved data is consistent. For example, the command processing component 118 may process the backup against the most recently captured snapshot 105. If the command processing component 118 determines that the dynamic data 107 is not being modified, the command processing component 118 may process the backup against the dynamic data 107 (instead of the snapshots 105) to ensure that the most up-to-date data is backed up. In turn, the command processing component 118 may store the retrieved data 110.

In some embodiments, the backup command 104 may be performed without allocating additional disk capacity beyond that in the plurality of data storage nodes. Additionally, the backup command 104 may be performed without allocating additional hardware beyond that in the plurality of data storage nodes. Alternatively or additionally, the plurality of data storage nodes may comprise a replica set, and the backup command 104 may be performed without allocating additional disk capacity beyond that in the replica set.

In some embodiments, the backup command 104 may open a backup cursor, such as a tailable cursor further described herein. In some embodiments, the backup command 104 may open no more than one backup cursor.

In some embodiments, the command processing component 118 may be configured to validate whether a storage engine supports the backup command 104, such as is further discussed herein.

In some embodiments, the database system may include some components that support the backup command 104 and other components that do not support the backup command 104.

The inventors have recognized and appreciated that these features may reduce the resource costs and improve the flexibility and convenience of data backups as discussed herein.

Example Database Systems

Figure 2:
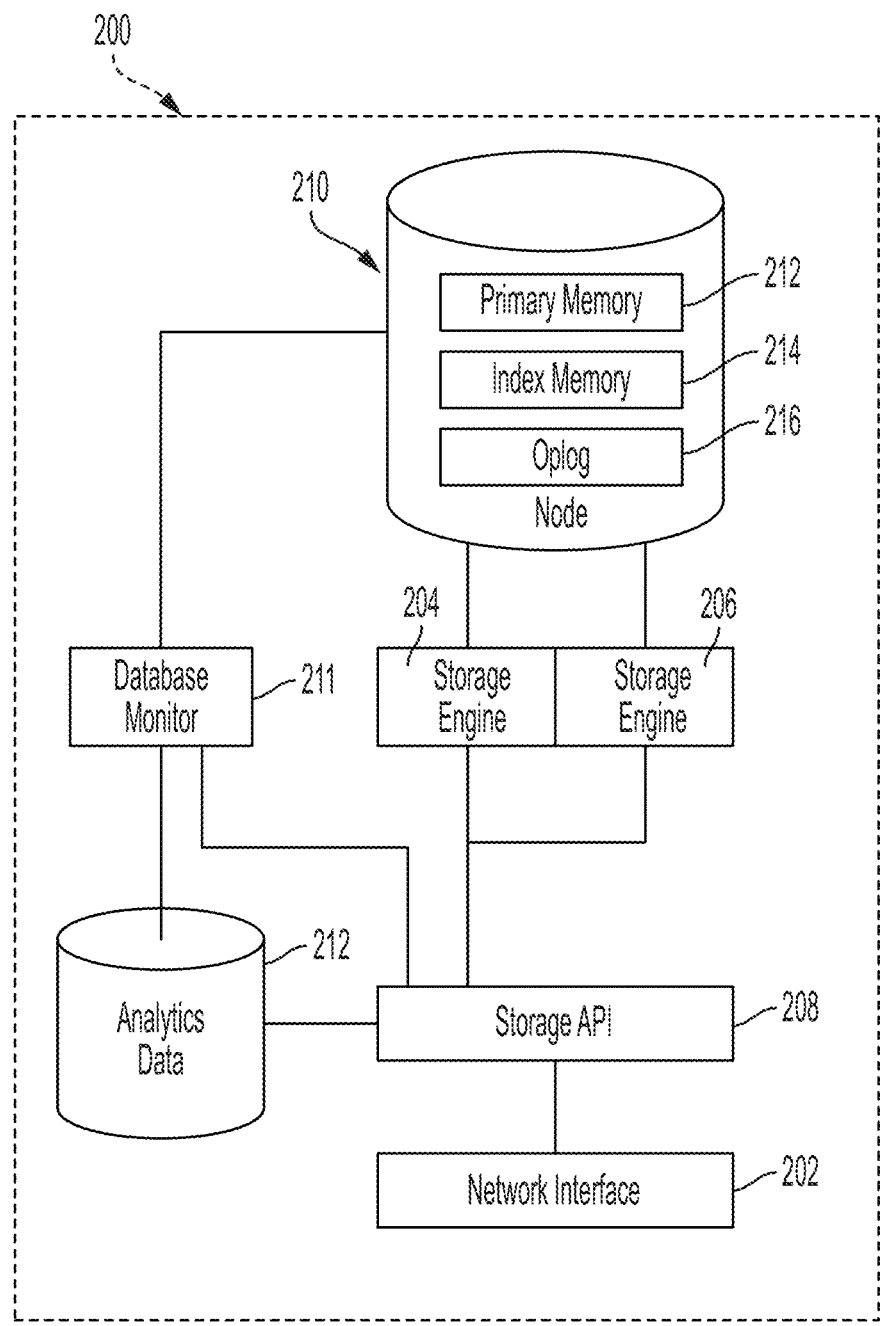
FIG. 2 is a block diagram of an example distributed database system, according to some embodiments.

An example of a database subsystem 200 is shown in FIG. 2. The database subsystem 200 includes an interface 202 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977,563, which is hereby incorporated by reference in its entirety. The database subsystem 200 includes a storage application. In one implementation, a base unit of data is a document.

In some embodiments, a storage application programming interface (API) 208 receives database requests, including requests to perform read and write operations. When a write operation is requested, the storage API 208 in response selectively triggers a first storage engine 204 or a second storage engine 206 configured to store data in a first data format or second data format, respectively, in node 210. A database monitor 211 may track a number of analytics about the database. In some embodiments, the database monitor 211 is configured to track the operations performed on the data over time, and stores that information as analytics data 213. In some examples, analytic data may be stored in a separate database. In other examples, the analytics data is stored as a name collection (i.e., a logical grouping of data). These analytics may be provided to the storage API 208, which relies on the analytics to selectively actuate an appropriate storage engine.

In one example, the database monitor 211 tracks the relative number of read and write operations performed on a collection within the database. In another example, the database monitor 211 is configured to track any operations (e.g., reads, writes, etc.) performed on any base unit of data in the database.

In some embodiments, the storage API 208 uses the tracked data (e.g., analytics data) collected by the database monitor 211 and/or the analytics data 213 to select an optimal storage engine for a database, a collection, or a document having the observed read/write ratio. In one example, the storage API 208 is mapped to the selected storage engine. For example, an identifier of the selected storage engine may be stored in a location in memory or on disk; when a write operation request is received by the storage API 208, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 211 itself is configured to determine an optimal storage engine based on the analytics data 213 and other aspects of the data, for example, stored in the database, database collection, or in a document. This determination may be passed to the storage API 208, or otherwise used to map the storage API 208 to a determined storage engine.

The storage API 208 receives database write requests (e.g., from a database API (not shown)) via a network interface 202, and carries out the requested operations by selectively triggering one of the first storage engine 204 and the second storage engine 206. The first storage engine 204 and the second storage engine 206 are executable software modules configured to store database data in the data node 210 in a particular data format. For example, the first storage engine 204 may be configured to store data in a row-store format, and the second storage engine 206 may be configured to store data in a LSM-tree format. In one example, the first storage engine 204 and/or the second storage engine 206 are configured store primary database data (i.e., the data being stored and queried) in a particular data format in the primary data memory 212, and may store database index data in a particular data format in index data memory 214. In one embodiment, the first storage engine 204 and/or the second storage engine 206 are configured to store an oplog ("operation log") 216 in a particular data format. A database monitor 211 may track a number of analytics about the database, and the operations performed on it over time, and store that information as analytics data 213.

One advantage of using the storage API 208 as an abstraction layer between the database API and the storage engines is that the identity and selection of a particular storage engine can be transparent to the database API and/or a user interacting with the database API. For example, the database API may pass a "write" function call to the storage API 208 instructing the storage API to write a particular set of data to the database. The storage API 208 then determines, according to its own analysis and/or user input, which storage engine should perform the write operation. Different storage engines may be appropriate for different types of data stored in different collections that may undergo a variety of different operations. Thus, the choice and implementation of calls to an appropriate storage engine are made by the API 208, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 208 is the ability to add, remove, or modify storage engines without modifying the requests being passed to the API 208. The storage API 208 is configured to identify the available storage engines and select the appropriate one based on a one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security, and operational tooling across different applications, each powered by different pluggable storage engines (e.g., WiredTiger ("WT")).

Figure 3:
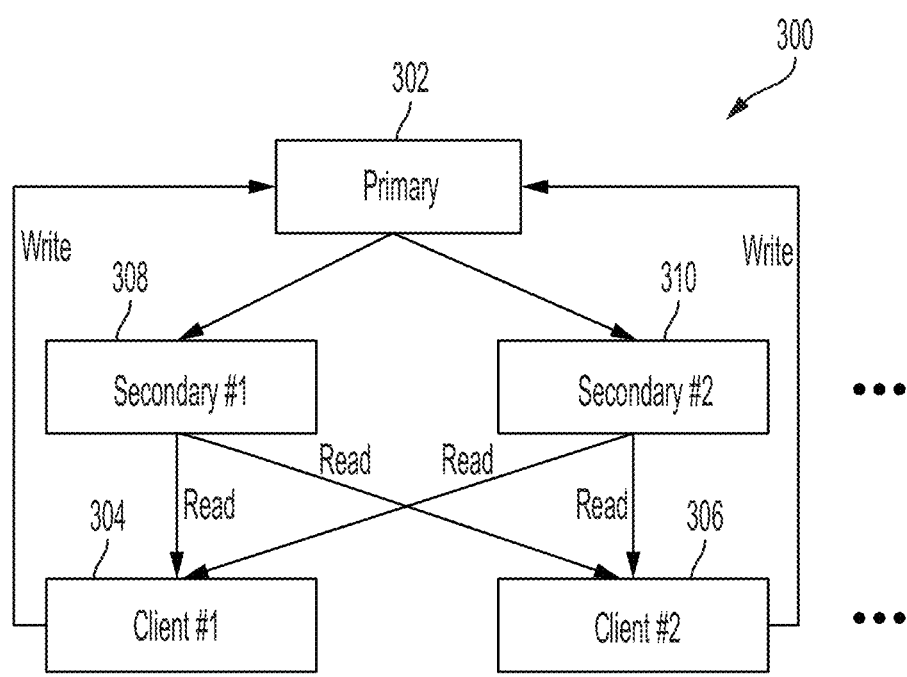
FIG. 3 is a block diagram of an example replica set hosting a distributed database, according to some embodiments.

The embodiment shown and discussed with respect to FIG. 2 depicts a single database node 210. Yet in some embodiments, multiple database nodes may be provided and arranged in a replica set. FIG. 3 shows a block diagram of an exemplary replica set 300. Replica set 300 includes a primary node 302 and one or more secondary nodes 308 and 310, each of which is configured to store a dataset that has been inserted into the database. The primary node 302 may be configured to store all of the documents currently in the database, and may be considered and treated as the authoritative version of the database in the event that any conflicts or discrepancies arise. While two secondary nodes 308, 310 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 302 and secondary nodes 308, 310 may be configured to store data in any number of database formats or data structures as are known in the art. In a preferred embodiment, the primary node 302 is configured to store documents or other structures associated with non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In some embodiments, the replica set primary node 302 only accepts write requests (disallowing read requests) from client systems 304, 306 and the secondary nodes 308, 310 only accept reads requests (disallowing write requests) from client systems 304, 306. In such embodiments, the primary node 302 receives and processes write requests against the database, and replicates the operation/transaction asynchronously throughout the system to the secondary nodes 308, 310. In one example, the primary node 302 receives and performs client write operations and generates an oplog. Each logged operation is replicated to, and carried out by, each of the secondary nodes 308, 310, thereby bringing those secondary nodes into synchronization with the primary node 302. In some embodiments, the secondary nodes 308, 310 may query the primary node 302 to receive the operation log and identify operations that need to be replicated. In other embodiments, the operation log may be transmitted from the primary node 302 to the secondary nodes 308, 310 periodically or in response to the occurrence of a predefined condition, such as accruing a threshold number of operations in the operation log that have not yet been sent to the secondary nodes 308, 310. Other implementations can be configured to provide different levels of consistency, by restricting read requests. For example, read requests can be restricted to systems having up to date data, read requests can also in some settings be restricted to primary systems, among other options.

Additional embodiments may execute different processes for replicating write operations with arbiter participation. According to one embodiment, an example process can include receipt of a write request at a primary node of a replica set. The primary node executes the write request and logs the operation. Secondary nodes can query the primary node periodically to obtain information on the primary's operation log. In one example, secondary nodes are configured to retrieve new operation log entries via a "tailable cursor." Tailable cursors are conceptually equivalent to the tail UNIX command with the -f option (i.e. with "follow" mode). After the primary executes any write operation (e.g., a client insert new or additional documents into a collection), the tailable cursor executed by the secondary node identifies the subsequent entry into the primary's operation log. The secondary node captures the new operation and executes it against the secondary node's copy of the database data.

In some embodiments, both read and write operations may be permitted at any node (including primary node 302 or secondary nodes 308, 310) in response to requests from clients. The scalability of read operations can be achieved by adding nodes and database instances. In some embodiments, the primary node 302 and/or the secondary nodes 308, 310 are configured to respond to read operation requests by either performing the read operation at that node or by delegating the read request operation to another node (e.g., a particular secondary node 308). Such delegation may be performed based on load-balancing and traffic direction techniques known in the art.

In some embodiments, the primary node 302 and the secondary nodes 308, 310 may operate together to form a replica set 300 that achieves eventual consistency, meaning that replication of database changes to the secondary nodes 308, 310 may occur asynchronously. When write operations cease, all replica nodes of a database will eventually "converge," or become consistent. The eventually consistent model provides for a loose form of consistency. In one particular example, (assuming >3 secondary systems) client systems (e.g., 304, 306) request write operations: W(x=3); W(x=7); W(x=5). As the replication of the write requests occurs asynchronously, at some point all of the secondary systems (e.g., 308, 310) will respond to a read request with 5. However, in the short term (during replication operations) client systems randomly reading from secondaries can see [read operations designated by R (variable and actual value)]: R(x==7); R(x==0); R(x==5); and R(x==3). In such a configuration, replica set 300 provides eventual consistency and can permit out of order reads (in the short term). Other example implementations can increase the strength of consistency, and for example, can include monotonic read consistency (no out of order reads). Eventual consistency may be a desirable feature where high availability is important, such that locking records while an update is stored and propagated is not an option. In such embodiments, the secondary nodes 308, 310 may handle the bulk of the read operations made on the replica set 300, whereas the primary node 308, 310 handles the write operations. For read operations where a high level of accuracy is important (such as the operations involved in creating a secondary node), read operations may be performed against the primary node 302. In some embodiments, replica set 300 can be configured to perform according to a single writer eventually consistent model.

It will be appreciated that the difference between the primary node 302 and the one or more secondary nodes 308, 310 in a given replica set may be largely the designation itself and the resulting behavior of the node; the data, functionality, and configuration associated with the nodes may be largely identical, or capable of being identical. Thus, when one or more nodes within a replica set 300 fail or otherwise become available for read or write operations, other nodes may change roles to address the failure. For example, if the primary node 302 were to fail, a secondary node 308 may assume the responsibilities of the primary node, allowing operation of the replica set to continue through the outage. This failover functionality is described in U.S. application Ser. No. 12/977,563, the disclosure of which is hereby incorporated by reference in its entirety.

Each node in the replica set 300 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 302 may be connected by a LAN, a WAN, or other connection to one or more of the secondary nodes 308, 310, which in turn may be connected to one or more other secondary nodes in the replica set 300. Connections between secondary nodes 308, 310 may allow the different secondary nodes to communicate with each other, for example, in the event that the primary node 302 fails or becomes unavailable and a secondary node must assume the role of the primary node.

Figure 4:
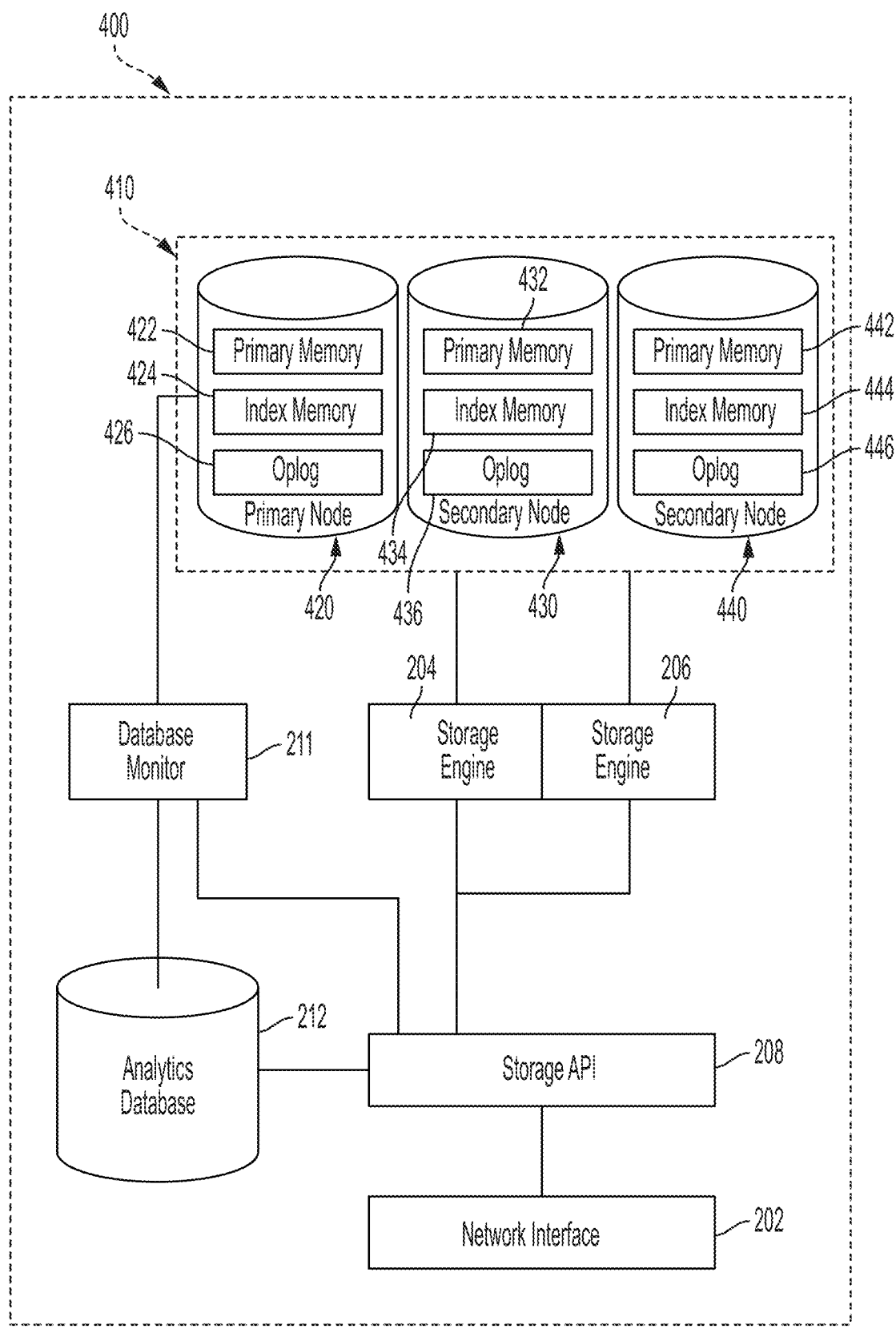
FIG. 4 is a block diagram of an example distributed database system, according to some embodiments.

An example of a database subsystem 400 incorporating a replica set 410 is shown in FIG. 4. As can be seen, database subsystem 400 incorporates many of the elements of database subsystem 200 of FIG. 2 including the network interface 202, the storage engines 204, 206, the storage API 208, the database monitor 211, and the analytics database 212. Relative to the database subsystem 200 shown in FIG. 2, the database subsystem 400 replaces the single node 210 with a replica set 410 comprising primary node 420 and secondary nodes 430 and 440. In one example, the replica set 410 functions in much the same manner as the replica set 300 discussed with respect to FIG. 3. While only two secondary nodes 430 and 440 are shown for illustrative purposes, it will be appreciated that the number of secondary nodes may be scaled up or down as desired or necessary.

In one example, database operation requests directed to the replica set 410 may be processed by the primary node 420 and either performed by the primary node 420 or directed to a secondary node 430, 440 as appropriate. In one embodiment, both read and write operations are permitted at any node (including primary node 420 or secondary nodes 430, 440) in response to requests from clients. The scalability of read operations can be achieved by adding nodes and database instances. In some embodiments, the primary node 420 and/or the secondary nodes 430, 440 are configured to respond to read operation requests by either performing the read operation at that node or by delegating the read request operation to another node (e.g., a particular secondary node 430). Such delegation may be performed based on load-balancing and traffic direction techniques known in the art.

In some embodiments, the database only allows write operations to be performed at the primary node 420, with the secondary nodes 430, 440 disallowing write operations. In such embodiments, the primary node 420 receives and processes write requests against the database, and replicates the operation/transaction asynchronously throughout the system to the secondary nodes 430, 440. In one example, the primary node 420 receives and performs client write operations and generates an oplog. Each logged operation is replicated to, and carried out by, each of the secondary nodes 430, 440, thereby bringing those secondary nodes into synchronization with the primary node 420 under an eventual-consistency model.

In one example, primary database data (i.e., the data being stored and queried) may be stored by one or more data storage engines in one or more data formats in the primary data memory 422, 432, 442 of nodes 420, 430, 440, respectively. Database index data may be stored by one or more data storage engines in one or more data formats in the index data memory 424, 434, 444 of nodes 420, 430, 440, respectively. Oplog data may be stored by a data storage engine in a data format in oplog data memory 426 of nodes 420.

Example Methods for Managing Backup Commands for a Database

Figure 5A:
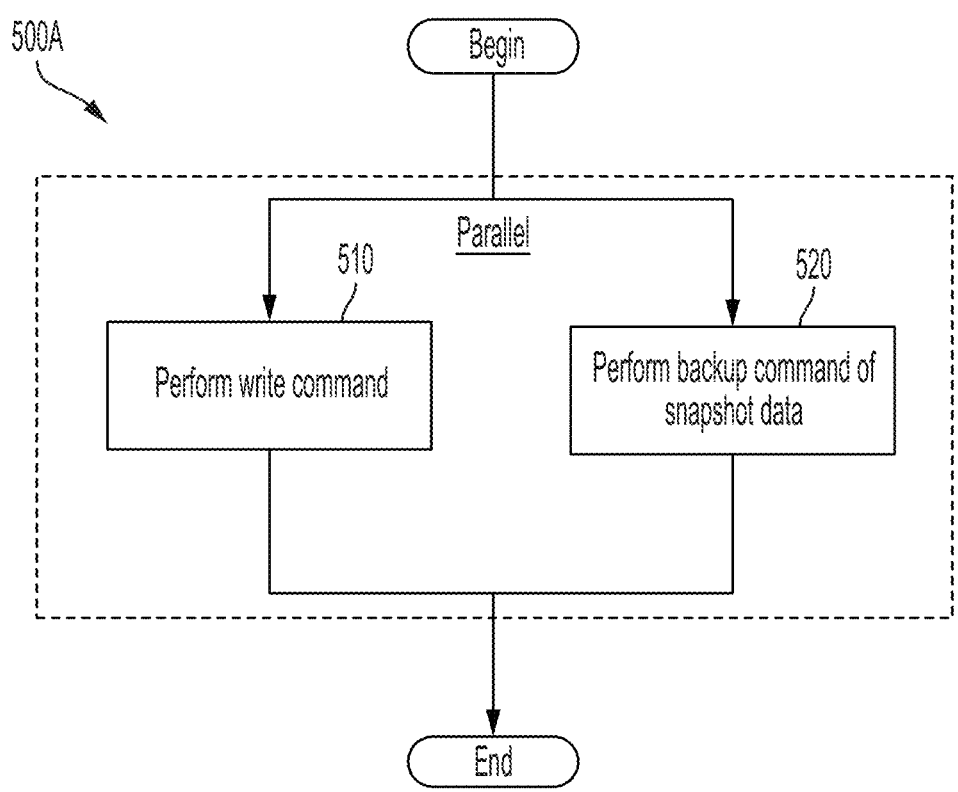
FIG. 5A is a flowchart showing an example method for performing at least one backup command in a database, according to some embodiments.

As discussed above, various systems may be configured to perform at least one backup command in a database having a plurality of data nodes. FIG. 5A shows an example process 500A according to some embodiments. Process 500A may be performed by a system (e.g., that shown in FIG. 1) to perform at least one backup command in a database, such as a database employing an eventual consistency model. In some embodiments, process 500A may include an act 510 of a write command that may be performed by, for example, a processor.

In some embodiments, process 500A may further include an act 520 of a backup command (such as backup command 104) that may be performed by a processor, which may be the same as or separate and distinct from the first processor. Process 500A may then end or repeat as necessary.

In some embodiments, the backup command may be performed at least partially in parallel with the write command. For example, the backup command may be a non-blocking backup command. Additionally, these commands may be performed on a secondary storage node of a plurality of secondary storage nodes in the database (the database may also include a primary storage node).

In some embodiments, the backup command may be performed without allocating additional disk capacity (or even additional hardware of any kind, in some embodiments) beyond that in the plurality of data storage nodes (or beyond that in the replica set of the nodes).

In some embodiments, the acts 510 and/or 520 may be performed by a client device and/or a server. Dividing the process 500A between multiple devices may advantageously reduce the total amount of time required to perform the process 500A by reducing the communication between the client device and the server.

Figure 5B:
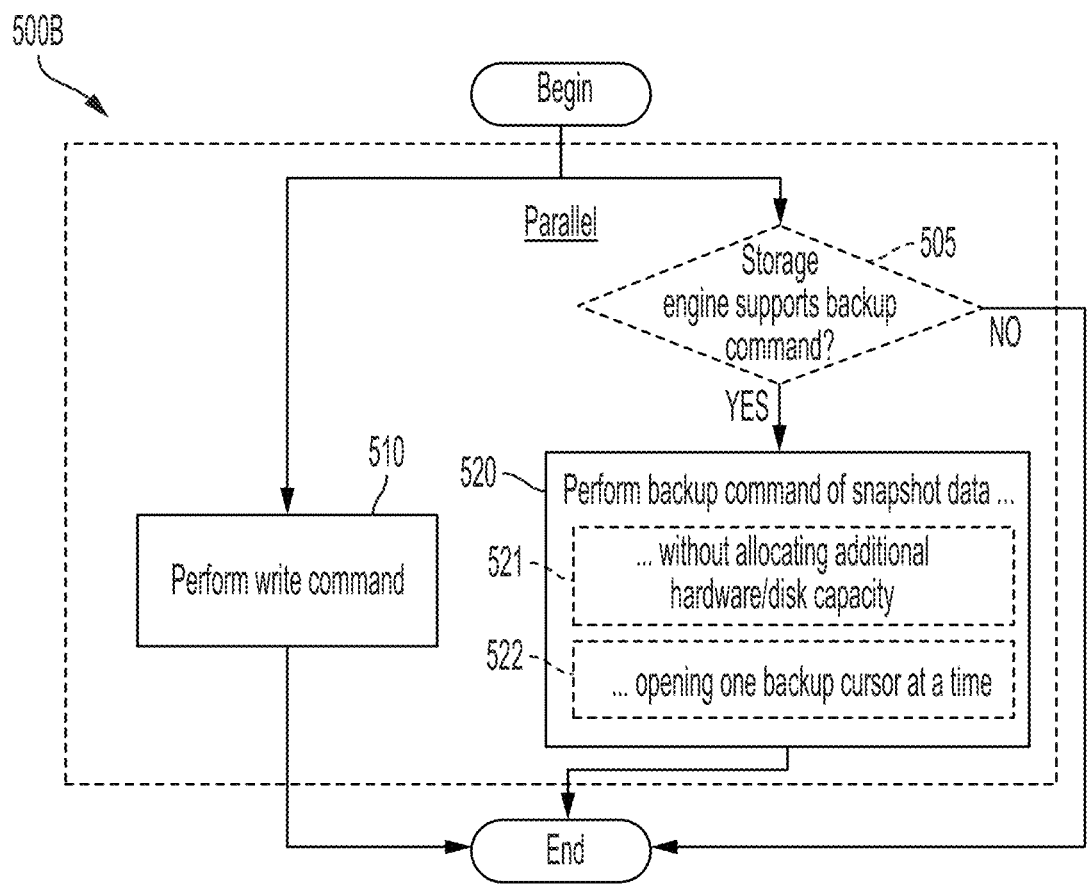
FIG. 5B is a flowchart showing an additional example method for performing at least one backup command in a database, according to some embodiments.

FIG. 5B shows an example process 500B according to some embodiments. Process 500B may be performed by a system (e.g., that shown in FIG. 1) to perform at least one backup command in a database, such as a database employing an eventual consistency model. In some embodiments, process 500B may include an act 510, similar to that described above. In some embodiments, process 500B may include an act 505 of determining whether a given storage engine (such as storage engine 204 or 206 shown in FIGS. 2 and 4) supports the backup command.

If a yes is determined in act 505, process 500B may optionally proceed to an act 520, similar to that described above. In some embodiments, act 520 may optionally include an act 521 of performing the backup command of snapshot data without allocating additional hardware/disk capacity. Alternatively or additionally, act 520 may optionally include an act 522 of opening a backup cursor one at a time. Process 500B may then end or repeat as necessary.

Alternatively, if a no is determined in act 505, process 500B may end or repeat as necessary. For example, write commands may be performed without backup commands being performed in parallel.

Figure 5C:
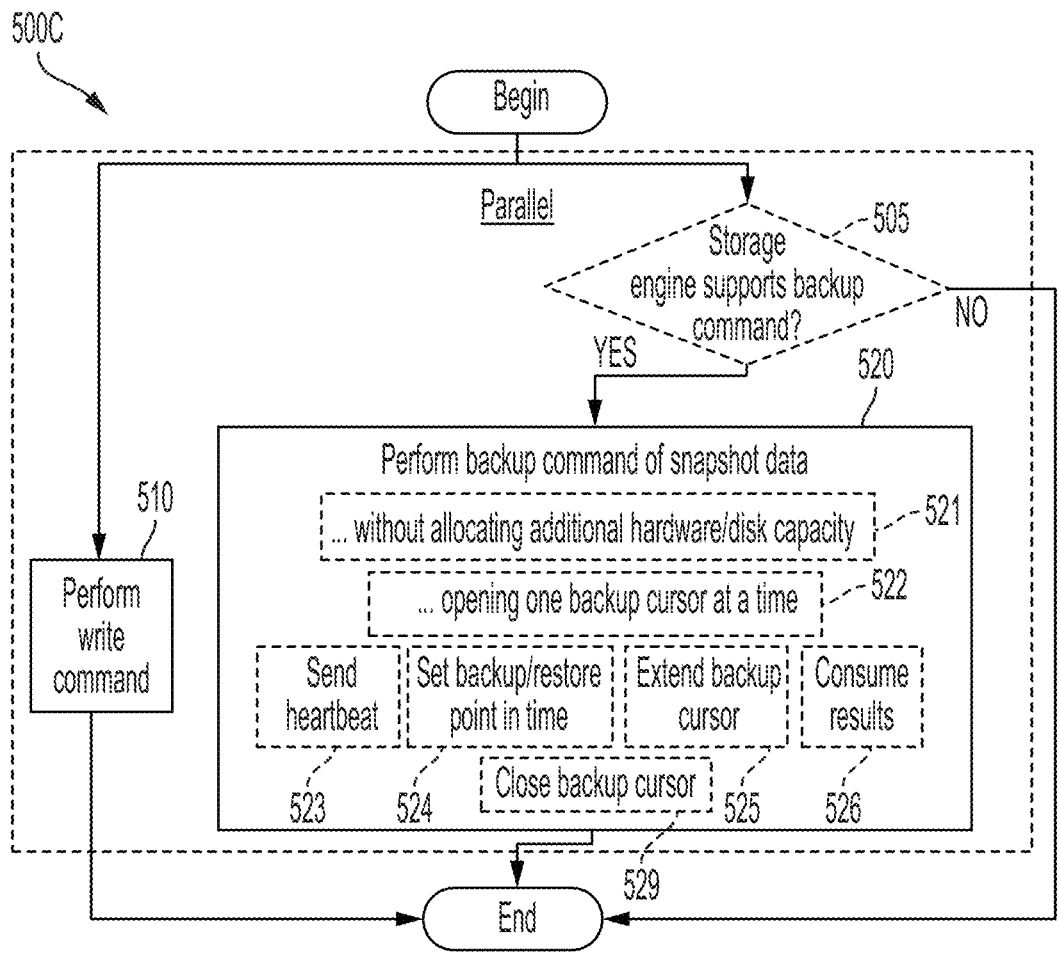
FIG. 5C is a flowchart showing another example method for performing at least one backup command in a database, according to some embodiments.

FIG. 5C shows an example process 500C according to some embodiments. Process 500C may be performed by a system (e.g., that shown in FIG. 1) to perform at least one backup command in a database, such as a database employing an eventual consistency model. In some embodiments, process 500C may include an act 510, similar to that described above. In some embodiments, process 500C may include an act 505 of determining whether a given storage engine (such as storage engine 204 or 206 shown in FIGS. 2 and 4) supports the backup command.

If a yes is determined in act 505, process 500C may optionally proceed to an act 520 of performing a backup command, similar to that described above. In some embodiments, the backup command may include or reference at least one metadata document and at least one file document. For example, a metadata document may be the first document in a response and may include information about replica sets, operation log(s), etc., and a file document may include a list of files to be copied as part of the backup. In some embodiments, the metadata document may have one key (e.g., "metadata") and its value may be a sub-document.

In some embodiments, act 520 may optionally include an act 521 of performing the backup command of snapshot data without allocating additional hardware/disk capacity. Alternatively or additionally, act 520 may optionally include an act 522 of opening a backup cursor one at a time. In some embodiments, an application opening a backup cursor will receive some metadata and a list of files that need to be copied. In some embodiments, the metadata may include: a handle representing the backup operation in progress; [1] the operation time (e.g., "OpTime") of the earliest oplog entry; [2] the OpTime of the latest oplog entry; and/or [3] the "timestamp" of the checkpoint the backup cursor is referencing. In some embodiments, [1-3] may not be included on a standalone backup cursor. Additionally, in some embodiments [1-2] may not be exact but may be minimums. For example, the data files copied may include oplog entries earlier than [1], and oplog entries later than [2]. Additionally, the checkpoint timestamp may be later than the time reported in [1] or [2]. In some embodiments, the data files may be played forward to any time at or later than this checkpoint timestamp. Additionally, the checkpoint timestamp may be no later than the OpTime of the latest oplog entry.

In some embodiments, the backup cursor may be a WT backup cursor and may allow applications to make backups by copying data files off the filesystem while still accepting incoming writes. In some embodiments, writes may be accepted (e.g., by WT) and data may persist while a backup cursor is open. For example, files being copied can be getting changed while the copy is happening. In some embodiments, the bytes in a file that are important to the backup may not be changed.

In some embodiments, the number of bytes to copy can be determined right after the backup cursor is opened. For example, after opening a backup cursor, only the first N bytes of each file may need to be copied, where N is that file's size reported by the operating system after the backup cursor was opened. Reading N bytes may always succeed, but it is plausible that an operating system read may return end of file before N bytes are read; in some embodiments, these are expected to be successful file copies, so long as killing the backup cursor succeeds (e.g., a kill cursors command receives a successful response, such as is discussed below).

Alternatively or additionally, act 520 may optionally include an act 523 of sending a heartbeat. In some embodiments, any suitable number of heartbeats may be sent in the background. In some embodiments, a getMore request may be sent to get the next batch of results. If a getMore request is not sent at least once every 10 minutes, the database system (e.g., a mongod instance) may in some embodiments release the backup cursor's resources and start overwriting data that was previously reserved for the backup. The inventors have recognized and appreciated that keeping backup cursors open is a significant resource cost, and some embodiments may employ similar heartbeats to help preserve resources and reduce costs (e.g., disk space). In some embodiments, a valid heartbeat may respond with an affirmative value (e.g., "ok: 1"), while a heartbeat after storage has released resources may respond with an opposite, zero, or negative value (e.g., "ok: 0" and/or a cursor not found error like "CursorNotFound").

Alternatively or additionally, act 520 may optionally include an act 524 of setting the backup or restore point in time (e.g., this point in time may be set to be the max of all "checkpointTimestamps"). For example, once all backup cursors have been opened (such as in act 522), the backup point in time (e.g., "backupPointInTime") may be set to the maximum of all checkpoint timestamps (e.g., "checkpointTimestamps"), like as follows:

backupPIT=restorePIT=max{checkpointTimestamp0, checkpointTimestamp1, . . . }

Alternatively or additionally, act 520 may optionally include an act 525 of extending each backup cursor to a backup or restore point in time, such as one set during act 524. For example, an aggregate command may be run with an exemplary pipeline of [{$backupCursorExtend: {backupId: <backupId>, timestamp: <backupPoint InTime>} } ]; the backupId may be returned in the "metadata" document from the "$backupCursor" command; the cursor may be created as a non-tailable cursor. In some embodiments, the command may not return immediately because it may wait for the node to have the full oplog history up to the backup point in time.

Alternatively or additionally, act 520 may optionally include an act 526 of consuming results. In some embodiments, a backup cursor may be opened with an aggregation command, which may return a tailable cursor to manage timeouts. In some embodiments, the command may ignore some options (e.g., "noTimeout") and the timeout may be otherwise managed by the server parameters (e.g., a server's "cursorTimeoutMillis" parameter). Once all of the results are consumed, subsequent getMore requests may bump the heartbeat and return end of file (e.g., EOF) in some embodiments. In some embodiments, a failing getMore request may respond with a zero or negative value (e.g., "ok: 0").

In some embodiments, an aggregation $backupCursor DocumentSource may take 1 as a value. This stage may be the first stage and it may not be expected for the pipeline to be followed by additional stages.

For an exemplary backup cursor (e.g., "{$backupCursor: { } }"), uasserts may apply if a backup cursor is already open, or if WT otherwise failed. In some embodiments, a WT instance may only support one backup cursor at a time.

In some embodiments, the backup cursor may return a metadata document followed by each file to copy (e.g., relative to the dbpath, taking into account parameters such as --directoryperdb and --wiredTigerDirectoryForindexes) as individual documents.

In some embodiments, any of acts 523, 524, 525, and 526 may be performed concurrently.

Alternatively or additionally, act 520 may optionally include an act 529 of closing backup cursor(s). For example, the backup cursor on each node may be closed immediately after all the files have been copied.

In some embodiments, performing the backup command may include closing the backup cursor. For example, after all files have been copied, the backup process may send a kill cursors command (e.g., killCursors) and receive a successful response, such as an affirmative value (e.g., "ok: 1"). In some embodiments, a successful response may include the cursor identifier (e.g., cursorId) that was sent as part of the request in the response's cursors killed array (e.g., cursorsKilled). If the cursor identifier is found in any other field, the kill cursors request may not have been successful. In some embodiments, the backup procedure may be aborted if it ever receives an error.

In some embodiments, an administrative command may be exposed that closes a given backup cursor without needing to know the handle it is associated with. The inventors have recognized and appreciated that it may be difficult to add diagnostics to inform how much disk space is being held onto by a backup cursor, and the techniques described above may provide less difficult alternatives.

Process 500C may then end or repeat as necessary.

Alternatively, if a no is determined in act 505, process 500C may end or repeat as necessary. For example, write commands may be performed without backup commands being performed in parallel.

Some embodiments of the acts above are described in more detail below. In some embodiments, commands such as those below may only be run by users with certain permissions (e.g., permission of the fsync action type).

In some embodiments, two separate pluggable storage engines (WiredTiger ("WT") instances) may exist: for example, one to store application data, and one to store encryption keys and a counter prefix for the initialization vector. For example, encrypted storage engines may hold encryption keys in a separate WT instance (e.g., in a subdirectory of the database path). In some embodiments, these files may be copied as part of a filesystem copy.

In some embodiments, initialization vectors (IV) may provide protection that minimizes the risk of cryptographic attacks. In some kinds of encryption (e.g., GCM), you may not reuse the same pair of encryption key and IV even across backups.

In some embodiments, encryption keys may be generated when the database is created. Additionally, IV may be generated when a new storage block is made, and the unique encryption key and IV pair may be used to encrypt the new block.

In some embodiments, during the backup the first WT instance may be copied over with the encrypted application data, and then the second WT instance that stores the encryption information may be copied over. The inventors have recognized and appreciated that this may allow the encryption information to always be at least as current as the application data.

In some embodiments, the encryption keys generated are themselves encrypted using a master key that a user specifies. Additionally, the keys may be stored encrypted on the second WT instance. In some embodiments, these files may also be copied as part of the filesystem copy.

In some embodiments, the database system may ensure that the IV pair is unique across backups. This may be done in some embodiments as follows: first by persisting a marker at the beginning of the backup process; once the backup is restored and sees the marker, it can generate new cryptographic keys for newly ingested data; the old encryption keys may continue to work with data written previously (prior to the backup).

Example Special-Purpose Computer System

A special-purpose computer system can be specially configured as disclosed herein. According to one embodiment, the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 6:
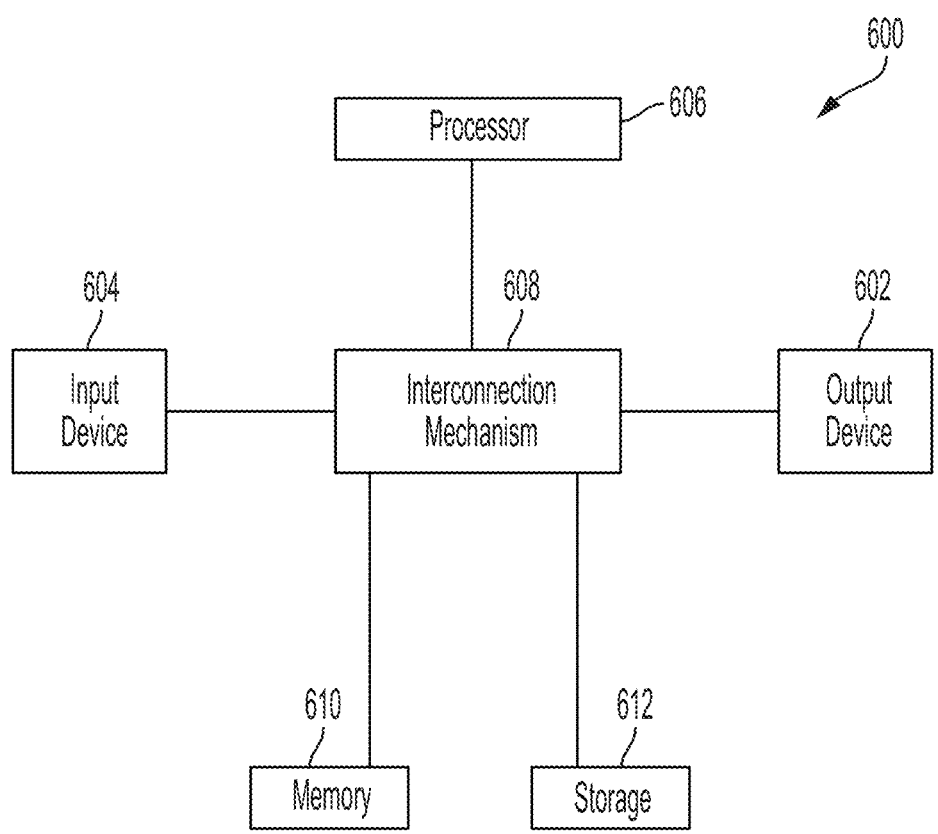
FIG. 6 is a block diagram of an example special-purpose computer system, according to some embodiments.

FIG. 6 shows a block diagram of an example special-purpose computer system 600 on which various aspects herein can be practiced. For example, computer system 600 may include a processor 606 connected to one or more memory devices 610, such as a disk drive, memory, or other device for storing data. Memory 610 is typically used for storing programs and data during operation of the computer system 600. Components of computer system 600 can be coupled by an interconnection mechanism 608, which may include one or more busses (e.g., between components that are integrated within a same machine) and/or a network (e.g., between components that reside on separate discrete machines). The interconnection mechanism enables communications (e.g., data, instructions) to be exchanged between system components of system 600.

Computer system 600 may also include one or more input/output (I/O) devices 602-604, for example, a keyboard, mouse, trackball, microphone, touch screen, a printing device, display screen, speaker, etc. Storage 612 typically includes a computer readable and writeable nonvolatile recording medium in which computer executable instructions are stored that define a program to be executed by the processor or information stored on or in the medium to be processed by the program.

Figure 7:
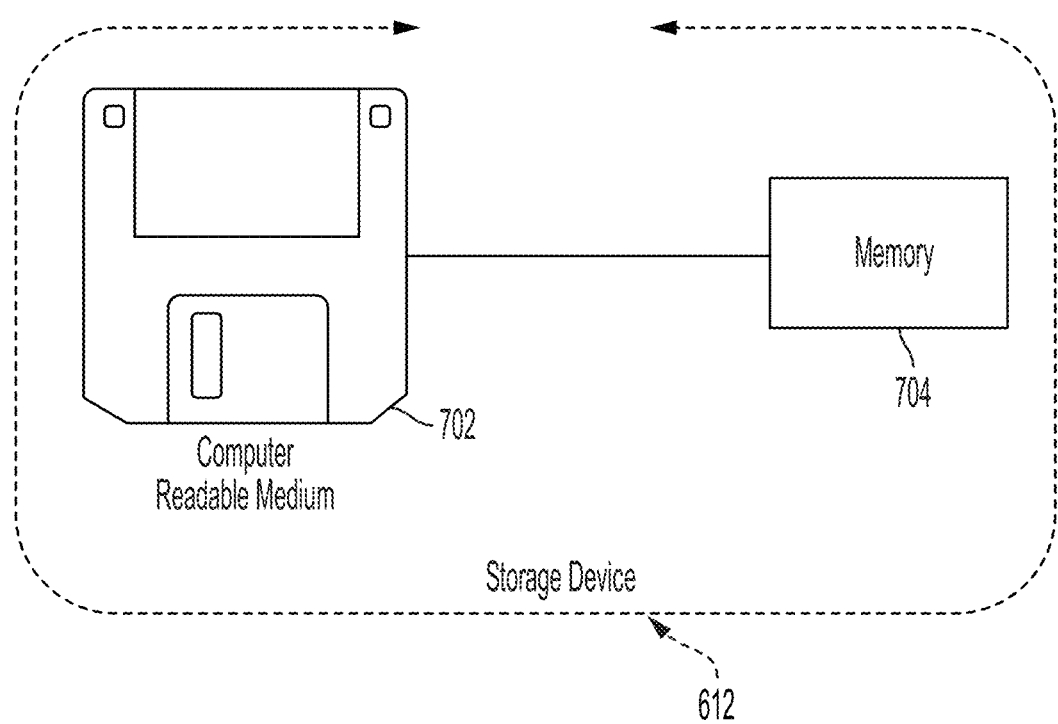
FIG. 7 is a block diagram of an example disk or flash memory, according to some embodiments.

The medium can, for example, be a disk 702 or flash memory as shown in FIG. 7. Typically, in operation, the processor causes data to be read from the nonvolatile recording medium into another memory 704 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 6, the memory can be located in storage 612 as shown, or in memory system 610. The processor 606 generally manipulates the data within the memory 610, and then copies the data to the medium associated with storage 612 after processing is completed. A variety of mechanisms are known for managing data movement between the medium and integrated circuit memory element and aspects herein are not limited thereto. Aspects herein are not limited to a particular memory system or storage system.

Figure 8:
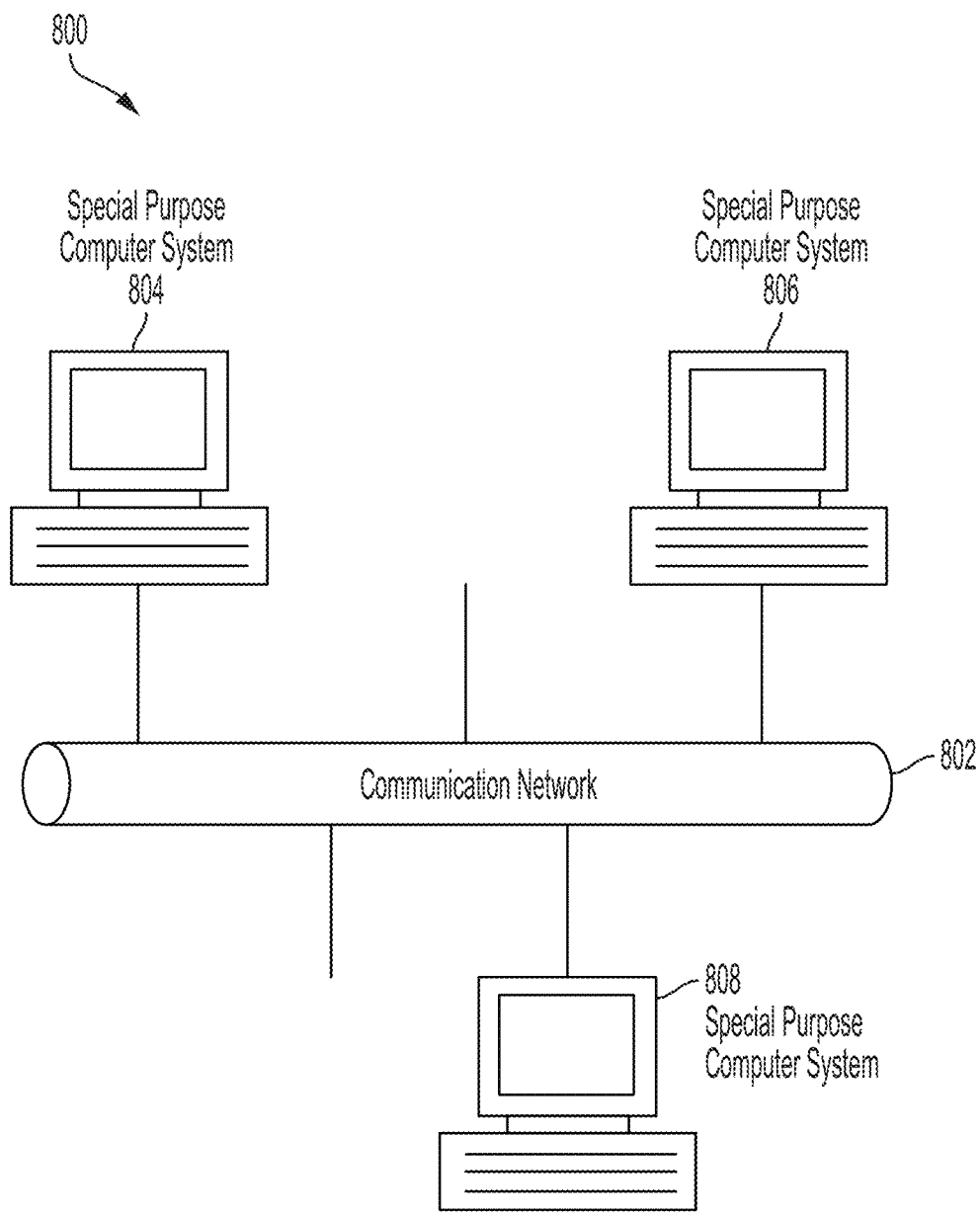
FIG. 8 is a block diagram of an example distributed system, according to some embodiments.

The computer system may include specially-programmed, special-purpose hardware, for example, an application-specific integrated circuit (ASIC). Aspects herein can be implemented in software, hardware or firmware, or any combination thereof. Although computer system 800 is shown by way of example, as one type of computer system upon which various aspects herein can be practiced, it should be appreciated that aspects herein are not limited to being implemented on the computer system as shown in FIG. 8. Various aspects herein can be practiced on one or more computers having different architectures or components than that shown in FIG. 8.

It should be appreciated that aspects herein are not limited to executing on any particular system or group of systems. Also, it should be appreciated that aspects herein are not limited to any particular distributed architecture, network, or communication protocol.

Various embodiments herein can be programmed using an object-oriented programming language, such as Java, C++, Ada, or C # (C-Sharp). Other programming languages may also be used. Alternatively, functional, scripting, and/or logical programming languages can be used. Various aspects herein can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects herein can be implemented as programmed or non-programmed elements, or any combination thereof.

Various aspects herein can be implemented by one or more systems similar to system 800 shown in FIG. 8. For instance, the system can be a distributed system (e.g., client server, multi-tier system) that includes multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, etc. These systems can also permit client systems to request database operations transparently, with various routing processes handling and processing requests for data as a single interface, where the routing processes can manage data retrieval from database partitions, merge responses, and return results as appropriate to the client, among other operations.

There can be other computer systems that perform functions such as hosting replicas of database data, with each server hosting database partitions implemented as a replica set, among other functions. These systems can be distributed among a communication system such as the Internet. One such distributed network, as discussed below with respect to FIG. 8, can be used to implement various aspects herein. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring two phase commit operations for updates.

FIG. 8 shows an architecture diagram of an example distributed system 800 suitable for implementing various aspects herein. It should be appreciated that FIG. 8 is used for illustration purposes only, and that other architectures can be used to facilitate one or more aspects herein.

System 800 may include one or more specially configured special-purpose computer systems 804, 806, and 808 distributed among a network 802 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

Implementation Examples

Below are described implementation examples and additional techniques that may be employed in any combination with the techniques described herein.

Exemplary Design

Example metadata document:

```
{oplogStart: <OpTime>, oplogEnd: <OpTime>, checkpointTimestamp: < Timestamp>}
   Example result (in raw batch form):
rs0:PRIMARY:test> db.runCommand({aggregate: 1, pipeline: [{$backupCursor: { }}],
cursor: {batchSize: 2}})
{
   "cursor" : {
      "firstBatch" : [
         {
            "metadata" : {
               "oplogStart" : {
                  "ts" : Timestamp(1531511392, 1),
                  "t" : NumberLong(-1)
               },
               "oplogEnd" : {
                  "ts" : Timestamp(1531753921, 1),
                  "t" : NumberLong(10)
               },
               "checkpointTimestamp" : Timestamp(1531753836, 1)
            }
         },
         {
            "filename" : "WiredTiger"
         }
      ],
      "id" : NumberLong("7303439737139317645"),
      "ns" : "test.$cmd.aggregate"
   },
   "ok" : 1,
   "operationTime" : Timestamp(1531753921, 1),
   "$clusterTime" : {
      "clusterTime" : Timestamp(1531753921, 1),
      "signature" : {
         "hash" : BinData( 0,
"AAAAAAAAAAAAAAAAAAAAAAAAAAA=" ) ,
         "keyId" : NumberLong(0)
      }
   }
}
```

Example of a successful getMore that bumps the timeout (and returns additional results if necessary):

```
rs0:PRIMARY:test> db.runCommand ({getMore: NumberLong("6487959715744292645"),
collection: "$cmd.aggregate"})
{
  "cursor" : {
    "nextBatch" : [ ],
    "id" : NumberLong("6487959715744292645"),
    "ns" : "test.$cmd.aggregate"
  },
  "ok" : 1,
  "operationTime" : Timestamp (1531512229, 1),
  "$clusterTime" : {
    "clusterTime" : Timestamp (1531512229, 1),
    "signature" : {
      "hash" : BinData ( 0,
      "AAAAAAAAAAAAAAAAAAAAAAAAAAA=" ) ,
      "keyId" : NumberLong(0)
    }
  }
}
```

Example of a failing getMore, which may imply the cursor has been closed:

```
rs0:PRIMARY:test> db.runCommand({getMore: NumberLong("7843704984318715395"),
collection: "$cmd.aggregate"})
{
  "operationTime" : Timestamp(1531512940, 1),
  "ok" : 0,
  "errmsg" : "cursor id 7843704984318715395 not found",
  "code" : 43,
  "codeName" : "CursorNotFound",
  "$clusterTime" : {
    "clusterTime" : Timestamp(1531512940, 1),
    "signature" : {
      "hash" : BinData ( 0,
      "AAAAAAAAAAAAAAAAAAAAAAAAAAA=" ) ,
      "keyId" : NumberLong(0)
    }
  }
}
```

Example of a successful killCursors:

```
rs0:PRIMARY:test> db.runCommand({killCursors: "$cmd.aggregate", cursors:
[NumberLong("7722649432796236387")]})
{
  "cursorsKilled" : [
    NumberLong ("7722649432796236387")
  ],
  "cursorsNotFound" : [ ],
  "cursorsAlive" : [ ],
  "cursorsUnknown" : [ ],
  "ok" : 1,
  "operationTime" : Timestamp(1531513964, 1),
  "$clusterTime" : {
    "clusterTime" : Timestamp(1531513964, 1),
    "signature" : {
      "hash" : BinData ( 0,
      "AAAAAAAAAAAAAAAAAAAAAAAAAAA="),
      "keyId" : NumberLong(0)
    }
  }
}
```

Example of a failing killCursors:

```
rs0:PRIMARY:test> db.runCommand({killCursors: "$cmd.aggregate", cursors:
[NumberLong("5738663684843068430")]})
{
  "cursorsKilled" : [ ],
  "cursorsNotFound" : [
    NumberLong("5738663684843068430")
  ],
  "cursorsAlive" : [ ],
  "cursorsUnknown" : [ ],
  "ok" : 1,
  "operationTime" : Timestamp(1531512960, 1),
  "$clusterTime" : {
    "clusterTime" : Timestamp(1531512960, 1),
    "signature" : {
      "hash" : BinData( 0,
      "AAAAAAAAAAAAAAAAAAAAAAAAAAA="),
      "keyId" : NumberLong(0)
    }
  }
}
```

Example of storage engine (e.g., "StorageEngine") interface changes: In some embodiments, begin and end methods (e.g., "beginNonBlockingBackup" and "endNonBlockingBackup") may be added. In some embodiments, storage engines that do not support these operations may return a CommandNotSupported error code. In some embodiments, beginNonBlockingBackup may return a list of files that need to be copied. In some embodiments, there may be additional changes required for sharding (e.g., coordinating what journal files have to be copied to guarantee enough oplog is captured).

In some embodiments, managing the lifetime of backup cursors may entangle a few different pieces (fsyncLock, the proposed $backupCursor aggregation command, storage engine backup cursors), so this design prescription is more at risk of changing than other parts.

Nevertheless, in some embodiments, a BackupCursorService class may be created that is a decoration on the ServiceContext. In some embodiments, this class may sit above the storage engine. In some embodiments, fsyncLock and $backupCursor aggregation stages may call distinct open/close methods on this class. In some embodiments, the class may serialize fsyncLock lifetimes with $backupCursor lifetimes—that is, an fsyncLock call that successfully opens a backup cursor may cause all $backupCursor actions to fail until fsyncUnlock is called. Likewise, a running $backupCursor may cause fsyncLock to fail. In some embodiments, the class may evaluate the guaranteed oplog range on $backupCursor open calls.

In some embodiments, the algorithm may include any combination of the following: Query the oplog with a sort of {$natural: −1} for the oplogEnd entry. Open the backup cursor. Query the oplog with a sort of {$natural: 1} for the oplogStart entry. The range represented by the first and last oplog entries is valid if and only if first <last. In some embodiments, a failure may close the backup cursor and return an error to the client; the client is free to retry.

Example of an Encrypted Storage Engine: In some embodiments, encryption hooks (e.g., "EncryptionHooks") may add a method to open a backup cursor on the encryption key database. In some embodiments, this method may return the list of files to copy. In some embodiments, the calling function may ensure the file names are presented to the user with subdirectory information. In some embodiments, a partner method may be added to EncryptionHooks for closing the backup cursor. In some embodiments, encryption keys' WT backup cursor may be opened after successfully opening the backup cursor on the main WT instance. This ordering may be correct because there are no destructive operations on the encryption keys database. In some embodiments, a later version of the encryption keys database is always sufficient for decryption of an earlier copy of data. In some embodiments, the storage section of server status may, if applicable, include whether there is an open backup cursor.

Exemplary Techniques: Replica Set Hot Backups Using a Backup Cursor (e.g., "$backupCursor")

1. Taking a Backup 1.1. Opening a Backup Cursor

In some embodiments, an aggregate command may be run with a pipeline of [{$backupCursor: { } } ]; a small batchSize may be set to see a complete response. In some embodiments, the cursor may implicitly be created as a tailable cursor.

1.1.1. Metadata Document Examples:

```
"metadata" : {
  "backupId" : UUID("02cae306-934f-4b9e-b649-8ea313be7567"),
  "dbpath" : "/home/dgottlieb/xgen/mongo2/data/db0",
  "oplogStart" : {
    "ts" : Timestamp(1542387926, 1),
    "t" : NumberLong(-1)
  },
  "oplogEnd" : {
    "ts" : Timestamp(1542388778, 1),
    "t" : NumberLong(1)
  },
  "checkpointTimestamp" : Timestamp(1542388768, 1)
}
"metadata" : {
  "backupId" : UUID(Mb7676912-2602-4e48-6351-ab982ba5c4a4"),
  "dbpath" : "/home/xy24/data/config",
  "oplogStart" : {
    "ts" : Timestamp(1545334543, 1),
    "t" : NumberLong(-1)
  },
  "oplogEnd" : {
    "ts" : Timestamp(1545336197, 2),
    "t" : NumberLong(1)
  },
  "checkpointTimestamp" : Timestamp(1545336166, 1)
}
```

In some embodiments, backupId may be an unique identifier for some embodiments of a backup process and may be used for extending the backup cursor. In some embodiments, closing a backup cursor via "killCursors" may require the aggregation cursorId, and extending via "$backupCursorExtend" may require this backupId.

In some embodiments, backupId may be unused for replica sets.

In some embodiments, dbpath may be the directory mongod is running against. This may be reported as an absolute path.

In some embodiments, oplogStart and oplogEnd may both be in the oplog on the copied data files. There may exist documents earlier than the oplogStart and documents later than the oplogEnd (the values may be conservative in that respect).

In some embodiments, checkpointTimestamp may be the state of the data if brought up in standalone mode. In some embodiments, the data can be "played forward" to any time later than the checkpointTimestamp. In some embodiments, opening backup cursors against a standalone and replica set nodes in initial sync should not report a checkpointTimestamp.

1.1.2. File Document Examples:

```
{
"filename" : "/home/dgottlieb/xgen/mongo2/data/dbO/WiredTiger"
}
{
"filename" : "/home/xy24/data/config/WiredTiger"
}
```

In some embodiments, the other variety of documents may represent the files to be copied as part of the backup. In some embodiments, the values may always be reported as an absolute path. In some embodiments, subtracting the metadata document's dbpath from these values should result in the relative path of the file with respect to the dbpath.

1.2. Requesting Additional Results

In some embodiments, the cursor ID can be parsed from the response to the aggregate command. In some embodiments, the response may contain a sub-document cursor which contains a sub-document id. This value is of the 64-bit integer type in bson. Examples:

MongoDB Enterprise rs0: PRIMARY: test >var cursorId=response ["cursor"] ["id"]
MongoDB Enterprise configRS:PRIMARY>var cursorId=response["cursor"]["id"]

In some embodiments, the next batch of results may be obtained by sending a getMore command. For example, {getMore: <cursorId>}) may be the first key/value pair to form a request; the second key/value pair may be {collection: "$cmd.aggregate"}.

1.3. Sending a Heartbeat
1.4. Closing the Cursor
2. Initial Sync Via Restore

In some embodiments, when using backed up data to seed an initial sync (whether for a new node, or an existing node), there should not be a need to throw away any writes. For example, the most recent version of the data may be suitable.

In some embodiments, it may be sufficient to copy the backed up files into place and start a mongod instance on them, such as follows:
cp -R data/backup/* data/db2/./mongod
--dbpath data/db2/ --port 20019

In some embodiments, if the node is already part of a replica set, no further commands may be necessary; otherwise, adding the node to the replica set configuration may be the only step remaining, such as follows:
MongoDB Enterprise rs0: PRIMARY: test >rs.add ("localhost:20019")

In some embodiments, there may be a notable difference from existing BRS restores. Conventionally, to rejoin an existing replica set, a node would need to be "seeded" with an oplog entry containing the timestamp/hash of the last applied oplog entry. In some embodiments, data copied via a backup cursor may contain the oplog; it may no longer be necessary to manipulate the oplog collection. 3. Cloning data into a new replica set (optionally to a point in time) In some embodiments, making a clone of a replica set may have the following steps 3.1-3.6:

3.1. Copy the Backed Up Files into a Clean Directory
In some examples:
cp -R data/backup/*data/db2/3.2.
3.2. Start a Standalone Mongod Instance on the Data Files
In some examples:
./mongod --dbpath data/db2/ --port 19990
3.3. Remove the Previous Replica Set Configuration and Other Collections In some embodiments, local.system.replset may not show up in a listCollections. Additionally, in some embodiments system collections may not be dropped, thus the "remove" below.
MongoDB Enterprise: local>db.replset.oplogTruncateAfterPoint.drop( ) true
MongoDB Enterprise:local>db.replset.election.drop( ) true
MongoDB Enterprise:local>db.replset.minvalid.drop( ) true
MongoDB Enterprise:local>db.system.replset.remove({ })
WriteResult({"nRemoved": 1})
3.4 Add in a New Replica Set Configuration Document
In some examples:

```
MongoDB Enterprise :local> db.system.replset.insert ({
  "_id" : "<newReplSetName>"
  "version" : NumberInt(1),
  "protocolVersion" : NumberInt(1),
  "members" : [
    {
      "id" : NumberInt(0),
      "host" : localhost:19990"
    }
  ],
  "settings" : {
  }
})
```

WriteResult ({"nInserted": 1})
3.5. (Optionally) Set the oplogTruncateAfterPoint Document to the Desired Point in Time
In some examples:

```
MongoDB Enterprise :local> db.replset.oplogTruncateAfterPoint.insert({
  _id: "oplogTruncateAfterPoint",
  "oplogTruncateAfterPoint": Timestamp(1543257305, 1)
})
```

WriteResult({"nInserted": 1})
In some embodiments, the time used may be in the range of (checkpointTimestamp, oplogEnd+1]. In some embodiments, this value may be inclusive; to include an operation associated with time T, the value may be set to T+1.
3.6. Restart the Node with --Replset <newReplSetName>
In some embodiments, once this is executed, the oplog between the checkpointTimestamp and the oplogTruncateAfterPoint may be applied. Because the node now considers itself to be a replica set with a majority of members up, it will persist the data at the oplogTruncateAfterPoint—1 as part of the next checkpoint/at shutdown.

4. Appendix: $backupCursor Request/Response 4.1. Open

In some examples:

```
MongoDB Enterprise rsO:PRIMARY:test> var response = db.runCommand({aggregate: 1,
pipeline: [{$backupCursor: {}}], cursor: {batchSize: 2}})
MongoDB Enterprise rsO:PRIMARY:test> response
{
    "cursor" : {
        "firstBatch" : [
            {
                "metadata" : {
                    "backupId" : UUID("02cae306-934f-4b9e-b649-8ea313be7567"),
                    "dbpath" : "/home/dgottlieb/xgen/mongo2/data/dbO",
                    "oplogStart" : {
                        "ts" : Timestamp(1542387926, 1),
                        "t" : NumberLong (–1)
                    },
                    "oplogEnd" : {
                        "ts" : Timestamp(1542388778, 1),
                        "t" : NumberLong(1)
                    },
                    "checkpointTimestamp" : Timestamp(1542388768, 1)
                }
            },
            {
                "filename" : "/home/dgottlieb/xgen/mongo2/data/dbO/WiredTiger"
            }
        ],
        "id" : NumberLong("6097361614580866405"),
        "ns" : "test.$cmd.aggregate"
    },
    "ok" : 1,
    "$clusterTime" : {
        "clusterTime" : Timestamp(1542388778, 1),
        "signature" : {
            "hash" : BinData(0,"AAAAAAAAAAAAAAAAAAAAAAAAAAA="),
            "keyId" : NumberLong(0)
        }
    },
    "operationTime" : Timestamp(1542388778, 1)
}
```

4.2. getMore

In some examples:

```
MongoDB Enterprise rs0:PRIMARY:test> response = db.runCommand({getMore: cursorId,
collection: "$cmd.aggregate"})
{
    "cursor" : {
        "nextBatch" : [
            {
                "filename" : "/home/dgottlieb/xgen/mongo2/data/dbO/WiredTiger.backup"
            },
            {
                "filename" : "/home/dgottlieb/xgen/mongo2/data/dbO/sizeStorer.wt"
            },
            {
                "filename" : "/home/dgottlieb/xgen/mongo2/data/dbO/index-998-1657604994862336394.wt"
            },
            {
                "filename" : "/home/dgottlieb/xgen/mongo2/data/dbO/index-996-1657604994862336394.wt"
            },
<snip>
            {
                "filename" : "/home/dgottlieb/xgen/mongo2/data/dbO/journal/WiredTigerLog.0000000004"
            }
        ],
        "id" : NumberLong("6097361614580866405"),
        "ns" : "test.$cmd.aggregate"
```

-continued

```
    },
    "ok" : 1,
    "$clusterTime" : {
            "clusterTime" : Timestamp(1542388808, 1),
            "signature" : {
                    "hash" : BinData(0,"AAAAAAAAAAAAAAAAAAAAAAAAAAA="),
                    "keyId" : NumberLong(0)
            }
    },
"operationTime" : Timestamp(1542388808, 1)
}
```

4.3. Successful Heartbeat
In some examples:

```
MongoDB Enterprise rs0:PRIMARY:test> db.runCommand({getMore: cursorId, collection:
"$ cmd.aggregate"})
{
  "cursor" : {
        "nextBatch" :   [ ],
        "id" : NumberLong("6465742599544964407"),
        "ns" : "test. $cmd.aggregate"
  },
  "ok" : 1,
  "$clusterTime" : {
        "clusterTime" : Timestamp(1542394398, 1),
        "signature" : {
                "hash" :
BinData(0,"AAAAAAAAAAAAAAAAAAAAAAAAAAA="),
                "keyId": NumberLong(0)
        }
  },
  "operationTime" : Timestamp(1542394398, 1)
}
```

4.4. Unsuccessful Heartbeat
In some examples:

```
MongoDB Enterprise rs0:PRIMARY:test> db.runCommand({getMore: cursorId, collection:
"$cmd.aggregate"})
{
  "operationTime" : Timestamp(1542394328, 1),
  "ok" : 0,
  "errmsg" : "cursor id 6097361614580866405 not found",
  "code" : 43,
  "codeName" : "CursorNotFound",
  "$clusterTime" : {
      "clusterTime" : Timestamp(1542394328, 1),
      "signature" : {
          "hash" : BinData(0,"AAAAAAAAAAAAAAAAAAAAAAAAAAA="),
          "keyId" : NumberLong(0)
      }
  }
}
```

4.5. Successful Close
In some examples:

```
MongoDB Enterprise rsO:PRIMARY:test> db.runCommand({killCursors: "$cmd.aggregate",
cursors: [cursorId]})
{
    "cursorsKilled" : [
      NumberLong("6097361614580866405")
    ],
    "cursorsNotFound" : [ ],
    "cursorsAlive" : [ ],
    "cursorsUnknown" : [ ],
    "ok" : 1,
    "$clusterTime" : {
```

4.6. Unsuccessful Close

In some examples:

```
MongoDB Enterprise rsl:PRIMARY:test> db.runCommand({killCursors: "$cmd.aggregate"
cursors: [NumberLong(1212)]})
{
    "cursorsKilled" : [ ],
    "cursorsNotFound" : [
        NumberLong(1212)
    ] ,
    "cursorsAlive" : [ ],
    "cursorsUnknown" : [ ],
    "ok" : 1,
    "$clusterTime" : {
        "clusterTime" : Timestamp(1543329541, 1),
        "signature" : {
            "hash" : BinData(0,"AAAAAAAAAAAAAAAAAAAAAAAAAAA="),
            "keyId" : NumberLong(0)
        }
    },
    "operationTime" : Timestamp(1543329541, 1)
}
```

Exemplary Techniques: Sharded Cluster Hot Backups Using $backupCursor and $backupCursorExtend
1-1.5: See Examples Above.
1.5.1. File Document

```
{
    "filename" :
        "/home/xy24/data/config/journal/WiredTigerLog.0000000003"
}
```

All the documents represent the additional journal files to be copied as part of the backup. The values are always reported as an absolute path. Subtracting the metadata document's dbpath from these values may result in the relative path of the file with respect to the dbpath.

1.5.2. Error Handling

In some embodiments, for a node with enableMajorityReadConcern=off configuration, if the command fails with error that the term has been changed, it may be possible that the pinned checkpoint has been rolled back (e.g., checkpoint could be ahead of majority committed point on nodes with enableMajorityReadConcern=off). In this case, the whole sharded backup process may be conservatively restarted on all nodes in some embodiments.

In some embodiments, for a node with enableMajorityReadConcern=on configuration, if the command fails with any error, it may be safe to only retry on that node, without a need to restart the whole sharded backup process.

2. Detecting Topology Changes

In some embodiments, it may be checked if the sharded cluster topology at backup/restore point in time matches with the topology at the time which nodes to backup is determined. For example, the backup may need to be invalidated if at backup/restore point in time, there are 3 shards A,B,C but only the data files of shard A,B have been copied. Below is an exemplary algorithm to detect topology changes after the backupPointInTime is determined according to some embodiments.

2.1. Read Shards Configuration with afterClusterTime read-Concern

In some embodiments, before closing the backup cursor on the config server, config.shards collection may be scanned with readConcern (level: "majority", afterClusterTime: <backupPointInTime>1. If the topology information does not match with the one when it was decided which nodes to backup, the backup may be conservatively invalidated. If they match, the oplog may still be checked since backup/restore point in time.

2.2. Examine the Oplog Since Backup/Restore Point in Time

In some embodiments, all the oplog may be obtained since backup/restore point in time from the same node; if there is any oplog related to the removeShard command, the backup may be conservatively invalidated. A typical removeShard command may replicate as an oplog entry that deletes a document from config.shards:

```
{"ts": Timestamp (1545335964, 1),
    "t": NumberLong(1),
    "h": NumberLong("-9035483393709375626"),
    "v": 2,
    "op": "d",
    "ns": "config.shards",
    "ui":           UUID("fd3c163b-2757-4e72-803d-69404e74e544"),
    "wall": ISODate("2018-12-20T19:59:24.908Z"),
    "o": {"_id": "rs3" } }
```

(Note: this read may have to be on the same node as the previous one because all oplog entries up to the majority point read in 2.1 may have to be scanned. If this read is incorrectly sent to a lagged secondary (minority), then some oplog history might be missed.)

3. Cloning Data into a New Sharded Cluster

3.1. Example to Copy the Backed Up Files into a Clean Directory cp -R data/backup/config data/restore/config
cp -R data/backup/shard0 data/restore/shard0
cp -R data/backup/shard1 data/restore/shard1
cp -R data/backup/shard2 data/restore/shard2
cp -R data/backup/shard3 data/restore/shard3

3.2. Example to Start Standalone Mongod Instance on the Data Files of Each Node ./mongod --dbpath data/restore/config --port 19990

3.3. Example to Remove the Previous Replica Set Configuration and Other Non-Oplog, Replication Related Collections Note that, in some embodiments, local.system.rep 1 set may not show up in a listCollections; additionally, system collections cannot be dropped, thus the "remove" below.

MongoDB Enterprise: local>db.replset.oplogTruncateAfterPoint.drop( )
true
MongoDB Enterprise:local>db.replset.election.drop( )
true
MongoDB Enterprise:local>db.replset.minvalid.drop( )
true
MongoDB Enterprise:local>db.system.replset.remove({ })
WriteResult({"nRemoved": 1})

3.4. Example to Add in a New Replica Set Configuration Document

In some embodiments, newReplSetName may also be the shard name.

```
MongoDB Enterprise :local> db.system.replset.insert({
    "_id" : "<newReplSetName>",
    "version" : NumberInt(1),
    "protocolVersion" : NumberInt (1),
    "members" : [
        {
            "_id" : NumberInt(0),
            "host" : "localhost:19990"
        }
    ],
    "settings" : {
    }
})
```

WriteResult({"nInserted": 1})

3.5. Example to Set the oplogTruncateAfterPoint Document to the Restore Point in Time+1

In some embodiments, since oplogTruncateAfterPoint is inclusive but keeping history up to the restore point in time may be desired, it may be set to be restore point in time+1. Note that since it may be desirable to restore the whole sharded cluster to a causally consistent state, all shards and the config server may need to be restored to the same restore point in time (restorePIT).

MongoDB Enterprise:local>truncateAfterPoint=Timestamp(restorePIT.getTime( ) restorePIT.getInc( )+1)

```
MongoDB Enterprise :local> db.replset.oplogTruncateAfterPoint.insert({
    _id: "oplogTruncateAfterPoint",
    "oplogTruncateAfterPoint": truncateAfterPoint
})
```

WriteResult({"nInserted": 1})

This example simply adds one to the "Inc" section of the timestamp, but some embodiments may check for 32-bit unsigned integer overflow; in that unlikely case, Timestamp(restorePIT.getTime( )+1, 1) may be chosen.

3.6. Example to Restart Each Node with setParameter and then Shutdown

In some embodiments, the mongod may replay all the oplog (up to restorePIT due to truncation) and take a checkpoint on shutdown.

./mongod --dbpath data/restore/config --port 19990 -setParameter
recoverFromOplogAsStandalone=true -- setParameter takeUnstableCheckpointOnShutdown=true Once the mongod is up and accepting connections, it may be safe to be shutdown via normal mechanisms in some embodiments.

(Note: this step may be used because the oplog may contain changes to shards configuration document and it may be desirable for those changes to be applied before modifying shards configuration in the following steps.)

3.7. Example to Start a Standalone Mongod Instance on the Config Server's Data Files ./mongod --dbpath data/restore/config --port 19990

3.8. Example to Remove the Previous Shards Configuration

MongoDB Enterprise:local>db.shards.remove({ })

3.9. Example to Add in New Shards Configuration Documents

```
MongoDB Enterprise :local> db.shards.insert(
    {
        _id: <newReplSetName0>
        host: <newHostName0>
        State: 1
    }
WriteResult({ "nInserted" : 1 })
MongoDB Enterprise :local> db.shards.insert(
    {
        _id: <newReplSetName1> host: <newHostName1>
        State: 1
    }
WriteResult({ "nInserted" : 1 })
...
        Example:
MongoDB Enterprise :local> db.shards.insert(
    {
        _id: "shard0",
        host: "shard0/localhost:40001",
        State: 1
    }
...
```

3.10. Example to Start a Standalone Mongod Instance on Each Shard's Data Files Take shard0 as an example:

./mongod --dbpath data/restore/shard0 --port 19990

3.11. Example to Update the shardIdentity Document

MongoDB Enterprise:admin>db.system.version.updateOne ({id: "shardIdentity" },
{$set: {shardName: <newReplSetName>, configsvrConnectionString: <newHostNameForConfigServer>} })

For example:

MongoDB Enterprise:admin>db.system.version.updateOne ({id: "shardIdentity" },
{$set: {shardName: "shard0", configsvrConnectionString: "configRS/localhost:40000"}})

3.12. Example to Drop all the Cache Collections in Config Db
MongoDB Enterprise:config>db.cache.collections.drop( )
true
MongoDB Enterprise:config>db.cache.databases.drop( )
true
MongoDB Enterprise: config>db.cache.chunks.config.system.sessions.drop( )
true
. . .

3.13. Example to Restart Each Node in the Sharded Cluster Using the New Hostname:Port
./mongod --dbpath data/restore/config --port 40000 --replSet configRS --configsvr
./mongod --dbpath data/restore/shard0 --port 40001 --replSet shard0 --shardsvr
./mongod --dbpath data/restore/shard1 --port 40002 --replSet shard1 --shardsvr
./mongod --dbpath data/restore/shard2 --port 40003 --replSet shard2 --shardsvr
./mongod --dbpath data/restore/shard3 --port 40004 --replSet shard3 --shardsvr
./mongos --configdb configRS/localhost: 40000

4. Appendix I: $backupCursor Request/Response
4.1. Example of Open
MongoDB Enterprise configRS:PRIMARY>var response=db.runCommand(1 aggregate: 1, pipeline: [{$backupCursor:{ }}], cursor: {batchSize: 2} })

```
MongoDB Enterprise configRS:PRIMARY> response
{
            "cursor" : {
            "firstBatch" : [
                {
                    "metadata" : {
                        "backupId" : UUID("b7b7b912-2602-4e48-b351-ab982ba5c4a4"),
                        "dbpath" : "/home/xy24/data/config",
                        "oplogStart" : {
                            "ts" : Timestamp(1545334543, 1),
                            "t" : NumberLong(-1)
                        },
                        "oplogEnd" : {
                            "ts" : Timestamp(1545336197, 2),
                            "t" : NumberLong(1)
                        },
                        "checkpointTimestamp" : Timestamp(1545336166, 1)
                    }
                },
                {
                    "filename" : "/home/xy24/data/config/WiredTiger"
                }
            ],
            "id" : NumberLong("4899475076602303800"),
            "ns" : "local.$cmd.aggregate"
        },
        "ok" : 1,
        "$gleStats" : {
            "lastOpTime" : Timestamp(0, 0),
            "electionId" : ObjectId("7fffffff0000000000000001")
        },
        "lastCommittedOpTime" : Timestamp(1545336197, 2),
        "$clusterTime" : {
            "clusterTime" : Timestamp(1545336197, 2),
            "signature" : {
                "hash" : BinData ( 0, "AAAAAAAAAAAAAAAAAAAAAAAAAAA=" ) ,
                "keyId" : NumberLong(0)
            }
        },
        "operationTime" : Timestamp(1545336197, 2)
}
```

MongoDB Enterprise configRS:PRIMARY>
4.2. Example of getMore
MongoDB Enterprise configRS: PRIMARY>response=db.runCommand({getMore: cursorId, collection: "$cmd.aggregate"})

```
MongoDB Enterprise configRS:PRIMARY> response
{
        "cursor" : {
        "nextBatch" : [
            {
                "filename" : "/home/xy24/data/config/WiredTiger.backup"
            },
            {
                "filename" : "/home/xy24/data/config/sizeStorer.wt"
            },
```

```
            {
                "filename" : "/home/xy24/data/config/index-7-7 870709084716679564.wt"
            },
            {
                "filename" : "/home/xy24/data/config/index-50-7 8 7 07 090 84 71667
9564.wt"
            },
            {
                "filename" : "/home/xy24/data/config/index-5-7 870709084716679564.wt"
            },
            ...
        ],
        "id" : NumberLong("4899475076602303800"),
        "ns" : "local.$cmd.aggregate"
    },
        "ok" : 1,
        "$gleStats" : {
            "lastOpTime" : Timestamp(0, 0),
            "electionId" : ObjectId("7fffffff0000000000000001")
        },
        "lastCommittedOpTime" : Timestamp(1545336507, 1),
        "$clusterTime" : {
            "clusterTime" : Timestamp(1545336507, 1),
            "signature" : {
                "hash" :
BinData(0,"AAAAAAAAAAAAAAAAAAAAAAAAAAA="),
                "keyId" : NumberLong(0)
            }
        },
        "operationTime" : Timestamp(1545336507, 1)
}
```

4.3. Example of Successful Heartbeat

```
MongoDB Enterprise configRS:PRIMARY> db.runCommand({getMore: cursorId,
collection: "$cmd.aggregate"})
{
        "cursor" : {
            "nextBatch" : [ ],
            "id" : NumberLong("4899475076602303800"),
            "ns" : "test.$cmd.aggregate"
        },
    "ok" : 1,
    "$clusterTime" : {
            "clusterTime" : Timestamp(1545336508, 1),
            "signature" : {
                "hash" BinData ( 0,
"AAAAAAAAAAAAAAAAAAAAAAAAAAA=" ) ,
                "keyId": NumberLong(0)
            }
    },
    "operationTime" : Timestamp(1545336508, 1)
}
```

4.4. Example of Unsuccessful Heartbeat

```
MongoDB Enterprise configRS:PRIMARY> db.runCommand({getMore: cursorId,
collection: "$cmd.aggregate"})
{
    "operationTime" : Timestamp(1545336591, 1),
    "ok" : 0,
    "errmsg" : "cursor id 4899475076602303800 not found",
    "code" : 43,
    "codeName" : "CursorNotFound",
    "$clusterTime" : {
        "clusterTime" : Timestamp(1545336591, 1),
        "signature" : {
            "hash" : BinData ( 0, "AAAAAAAAAAAAAAAAAAAAAAAAAAA="),
            "keyId" : NumberLong(0)
        }
    }
}
```

4.5. Example of Successful Close

```
MongoDB Enterprise configRS:PRIMARY> db.runCommand({killCursors:
"$cmd.aggregate", cursors: [cursorId]})
{
    "cursorsKilled" : [
        NumberLong("4899475076602303800")
    ],
    "cursorsNotFound" : [ ],
    "cursorsAlive" : [ ],
    "cursorsUnknown" : [ ],
    "ok" : 1,
    "$clusterTime" : {
        "clusterTime" : Timestamp(1545336509, 1),
        "signature" : {
            "hash" : BinData ( 0, "AAAAAAAAAAAAAAAAAAAAAAAAAAA="),
            "keyId" : NumberLong(0)
        }
    },
    "operationTime" : Timestamp(1545336509, 1)
}
```

4.6. Example of Unsuccessful Close

```
MongoDB Enterprise configRS:PRIMARY> db.runCommand({killCursors:
"$cmd.aggregate", cursors: [NumberLong(1212)]})
{
    "cursorsKilled" : [ ],
    "cursorsNotFound" : [
        NumberLong(1212)
    ],
    "cursorsAlive" : [ ],
    "cursorsUnknown" : [ ],
    "ok" : 1,
    "$clusterTime" : {
        "clusterTime" : Timestamp(1545336510, 1),
        "signature" : {
            "hash" : BinData ( 0, "AAAAAAAAAAAAAAAAAAAAAAAAAAA="),
            "keyId" : NumberLong(0)
        }
    },
    "operationTime" : Timestamp(1545336510, 1)
}
```

5. Appendix II: $backupCursorExtend Request/Response
5.1. Example of Open

```
MongoDB Enterprise configRS:PRIMARY> response = db.runCommand(
{
                aggregate: 1,
                pipeline: [
                    {
                        $backupCursorExtend:
                            {
                                backupId: UUID("b7b7b912-2602-4e48-b351-ab982ba5c4a4"),
                                timestamp: Timestamp(1545337003, 1)
                            }
                    }
                ],
                cursor: {batchSize: 2}
})
MongoDB Enterprise configRS:PRIMARY> response
{
    "cursor" : {
    "firstBatch" : [
    {
        "filename" : "/home/xy24/data/config/journal/WiredTigerLog.0000000003"
    }
    ],
    "id" : NumberLong(0),
     "ns" : "local.$cmd.aggregate"
    },
```

```
        "ok" : 1,
        "$gleStats" : {
                        "lastOpTime" : Timestamp(0, 0),
                        "electionId" : ObjectId("7fffffff0000000000000001")
        },
        "lastCommittedOpTime" : Timestamp(1545337 068, 1),
        "$clusterTime" : {
                        "clusterTime" : Timestamp(1545337068, 1),
                        "signature" : {
                            "hash" : BinData(0,"AAAAAAAAAAAAAAAAAAAAAAAAAAA="),
                            "keyId" : NumberLong(0)
                        }
        },
        "operationTime" : Timestamp(1545337068, 1)
}
```

6. Appendix III: Topology Changes Detection Read/Result
6.1. Example of Read Shards Configuration
MongoDB Enterprise configRS:PRIMARY>use config
switched to db local

```
MongoDB Enterprise configRS:PRIMARY> db.runCommand(
                        {
                            find: "shards",
                            sort: {_id: 1},
                            readConcern: {
                            level: "majority",
                            afterClusterTime: Timestamp(1545334670, 1)
                            }
                        })
{
        "cursor" : {
                "firstBatch" : [
                        {
                                "_id" : "rs0",
                                "host" : "rs0/localhost:40001",
                                "state" : 1
                        },
                        {
                                "_id" : "rsl",
                                "host" : "rsl/localhost:40002",
                                "state" : 1
                        },
                        {
                                "_id" : "rs2",
                                "host" : "rs2/localhost:40003",
                                "state" : 1
                        },
                        {
                                "_id" : "rs3",
                                "host" : "rs3/localhost:40004",
                                 state" : 1
                        }
                ],
                "id" : NumberLong(0),
                "ns" : "config.shards"
        },
        "ok" : 1,
        "$gleStats" : {
                "lastOpTime" : Timestamp(0, 0),
                "electionId" : ObjectId("7fffffff0000000000000001")
        },
        "lastCommittedOpTime" : Timestamp(1545335082, 1),
        "$clusterTime" : {
                "clusterTime" : Timestamp(1545335082, 1),
                "signature" : {
                   "hash" : BinData( 0, "AAAAAAAAAAAAAAAAAAAAAAAAAAA="),
                   "keyId" : NumberLong(0)
                }
        },
        "operationTime" : Timestamp(1545335082, 1)
}
```

6.2. Example to Read Oplog Entries Since Backup/Restore Point in Time

MongoDB Enterprise configRS:PRIMARY>use local
switched to db local
MongoDB Enterprise configRS:PRIMARY>db.oplog.rs.find({"ts": {$gt: Timestamp (1545334670, 1)}})
{"ts": Timestamp(1545334676, 1), "t": NumberLong(1), "h": NumberLong("-27290485507231 20527"), "v": 2, "op": "u", "ns": "config.mongos", "ui": UUID("2193aaae-03e6-4b3e-a90f-1d372605bbf2"), "o2": {
"_id": "fishbowl:27017" }, "wall": ISODate("2018-12-20T19:37:56.901Z"), "o":
{"$v": 1, "$set": {"ping": ISODate("2018-12-20T19:37:56.901Z"), "up":
NumberLong(130)} } }
{"ts": Timestamp(1545334683, 1), "t": NumberLong(1), "h": NumberLong("-5244263552854556147"), "v": 2, "op": "u", "ns":
"config.lockpings", "ui": UUID("bf37 034b-da5e-4 9f4-8e2e-d2dc762a011d"), "o2":
{"_id": "fishbowl:40001:1545334623: 337140104911416886" 1, "wall":
ISODate("2018-12-20T19:38:03.875Z"), "o": {"$v": 1, "$set": {"ping":
ISODate("2018-12-20T19:38:03.874Z")} } }
{"ts": Timestamp(1545334686, 1), "t": NumberLong(1), "h":
NumberLong("-6436634380689556324"), "v": 2, "op": "u", "ns":
"config.mongos", "ui": UUID("2193aaae-03e6-4b3e-a90f-1d372605bbf2"), "o2": {
"_id": "fishbowl:27017" }, "wall": ISODate("2018-12-20T19:38:06.907Z"), "o":
{"$v": 1, "$set": {"ping": ISODate ("2018-12-20T19:38:06.90 6Z"), "up":
NumberLong(140)} } }
{"ts": Timestamp(1545334689, 1), "t": NumberLong(1), "h":
NumberLong("6896307623169423663"), "v": 2, "op": "u", "ns":
"config.lockpings", "ui": UUID("bf37 034b-da5e-4 9f4-8e2e-d2dc762a011d"), "o2": {
"_id": "fishbowl:40002:1545334629: 2083626152775054745" }, "wall":
ISODate("2018-12-20T19:38:09.898Z"), "o": {"$v": 1, "$set": {"ping":
ISODate("2018-12-20T19:38:09.903Z")} } }
{"ts": Timestamp(1545334692, 1), "t": NumberLong(1), "h":
NumberLong("8747381341940001040"), "v": 2, "op": "u", "ns":
"config.lockpings", "ui": UUID("bf37034b-da5e-49f4-8e2e-d2dc762a011d"), "o2"
{"_id": "ConfigServer" }, "wall": ISODate("2018-12-20T19:38:12.608Z"), "o":
{"$v": 1, "$set": {"ping": ISODate("2018-12-20T19:38: 12.608Z") }}}

Exemplary Design: File System Snapshot of Encrypted Storage Engine

In some embodiments, GCM (Galois Counter Mode) usage may be made safe by making sure that no combination of IV sequence and AES key can ever be reused by a restored filesystem snapshot. This may involve versioning and adding key identifiers to the layout of the encrypted WiredTiger pages on disk, and rotating database keys whenever a snapshot is detected.

In some embodiments, the encrypted storage engine (ESE) may support using GCM to encrypt data on disk. The inventors have recognized and appreciated that one requirement of using GCM is that the counter used as the IV (initialization vector) may never be re-used for the same key. Given a portion of the counter that guarantees uniqueness may be incremented on server startup, it is possible to reuse a counter value when writing to data that has been restored from a filesystem snapshot and the original data is still available in some embodiments.

In some embodiments, the database keys used to encrypt WiredTiger pages will be rotatable on server startup. In some embodiments, each key may have a unique 32-bit numeric ID (starting at zero and increasing) that is embedded in each encrypted page. If the server detects that it was shutdown with an open backup cursor, or if a rotation is explicitly requested, it may rotate the database keys before accepting writes in some embodiments. In some embodiments, each rotation may introduce a new 32-bit IV counter that starts at zero, ensuring that no combination of key and IV is re-used after a snapshot is taken.

If a CBC cipher mode is being used, then this design may not apply in some embodiments; the ability to roll over database keys may be disabled if the cipher mode is CBC.

In some embodiments, if mongod is started with the storage engine in read-only mode, then this design may not apply. It may be safe to start a "dirty" ESE if the storage engine is in read-only mode because IV reuse may only occur during writes.

In some embodiments, keys generated at will may be used to encrypt pages by encrypting them with the database keys and storing the encrypted key in the header of the encrypted page. For example, to decrypt a page the page header may be read, the embedded key may be decrypted, and then the page may be decrypted with the decrypted key. This technique may be unused in some embodiments because in order to safely store the encrypted ephemeral key, GCM may not be used because it may have a IV-reuse problem.

In some embodiments, other cryptographic primitives, such as CBC-HMAC, may be used for encryption or authentication.

Exemplary Keystore Schema Changes

In some embodiments, the keystore may be a WiredTiger table accessed directly as packed structs via the WiredTiger C API. For example, the only changes may be to the keystore table schema; all C++ types below are assumed to be types from the standard library. In some embodiments, the keystore schema may be as shown in FIG. 10A.

In some embodiments, after a key rotation in 4.2, the keystore schema may be as shown in FIG. 10B.

Exemplary Metadata File

In some embodiments, there may also be a new BSON file encrypted with the ESE master key in the dbpath called "mongod-ese-metadata.bson" containing metadata about the state of the keystore as a single BSON object:

```
{
    "schemaVersion": NumberInt32(0),
    "dirty" : false
}
```

In some embodiments, access to the metadata file may be synchronized by a mutex and all changes to the file may be fsync'd and flushed to disk before the mutex is released. In some embodiments, failing to flush changes to the metadata file to disk may fassert the server.

In some embodiments, the schema version may be either zero for pre-4.2 ESE data or one for 4.2 ESE data. If no metadata file is present, but a keystore exists, a new metadata file may be written at startup during ESE initialization with schemaVersion set to zero in some embodiments. With either an empty dbpath or after a key rollover, the schemaVersion may be set to one in some embodiments.

In some embodiments, the dirty flag may be set when a backup cursor is opened (before it is returned to the user) and cleared when a backup cursor is closed (after the user has closed it); this file may be included with the files that are backed up as part of a snapshot.

On Server Startup

In some embodiments, if the server is started in read-only mode then attempting to roll over the keys may result in an error and no schema upgrade will be performed.

In some embodiments, the metadata file may be opened and it may be checked whether the dirty flag is set. If it is set, then the server may automatically initiate the key rollover procedure in some embodiments.

In some embodiments, the keystore WiredTiger connection may be opened, and if the server was started with --eseDatabaseKeyRollover, the key rollover procedure detailed below may be initiated.

Example if the schema version is zero:
1. A new table with the version one schema may be created in the keystore WiredTiger session with a temporary name of key. store-upgradetmp
2. Any existing keys in the old keystore may be inserted into the new keystore with the rollover ID set to zero
3. The old keystore may be invalidated by renaming the table to "keystore-invalidated-{terseCurrentTime}", the same way the master key rollover procedure may invalidate old keystores.
4. The new keystore may be renamed to the "keystore" name.
5. The metadata file may be updated to reflect that the schemaVersion is one and the keystore is not dirty.

Example if the schema version is one: Inserts into the keystore may be done during a single WiredTiger transaction to ensure that crashes while rolling over the keystore do not corrupt the keystore.

Example if the cipher mode is CBC or the storage engine is not WiredTiger: If the --eseDatabaseKeyRoilover option is specified, the server may exit with an error.

Changes to Encrypted Page Format

In pre-4.2 ESE, the encrypted page format may be just an IV followed by cipher text. For GCM, that could mean the page format was as shown in FIG. 10C in some embodiments. * denotes that the value is included as additional authenticated data in the GCM authentication tag of the cipher text.

In some embodiments, the initialization count may never be allowed to go beyond $2^{32}-11$, and the value could never go beyond $2^{32}-1$ (the maximum value of a uint32_t). This may be used to version the encrypted page format in some embodiments. The version one encrypted page layout may be as shown in FIG. 10D in some embodiments.

In some embodiments, for the GCM cipher mode, it is possible to read version zero encrypted pages transparently because the invocation count being less than $2^{32}-1$ may effectively version the page. For version zero pages, the key may be determined by looking at the database name and finding the appropriate key for rollover ID zero in some embodiments.

In some embodiments, for the CBC cipher mode, the encrypted page format may be unchanged because the version zero schema may be required with the CBC cipher mode.

Requirements and Behaviors

In some embodiments, using a backup with the GCM cipher mode created by a backup cursor may require that the ESE schema be upgraded to one by explicitly rolling over the database keys, such as is described herein. Once the schema has been upgraded, an initial sync to downgrade back to the 4.0 file format may be needed in some embodiments.

In some embodiments, database administrators may open and close backup cursors, and otherwise configure ESE and the database overall.

In some embodiments, backup/storage administrators may open and close backup cursors, and have access to backup snapshots and potentially the live filesystem.

In some embodiments, a key management system (KMS) may store the key that encrypts the keystore and metadata.

In some embodiments, an ESE metadata file may contain the state of the encrypted data on disk. In some embodiments, ESE keystore may contain all the keys used to actually decrypt/encrypt user data on disk. In some embodiments, filesystem and block storage containing the database and non-user ESE data, filesystem snapshots created as part of a backup, encrypted pages containing authenticated metadata about the version and format of the encrypted data, and a master key encrypting all ESE metadata may be employed.

Having thus described several aspects and embodiments, it is to be appreciated that various alterations, modifications, and improvements will readily occur to those skilled in the art. Such alterations, modifications, and improvements are intended to be part of this disclosure, and are intended to be within the spirit and scope of aspects herein. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A database system comprising:
    a database comprising a plurality of data storage nodes, the plurality of data storage nodes forming a replica set, the plurality of data storage nodes including, in the replica set, a primary storage node and a plurality of secondary storage nodes; and
    at least one processor configured to:
        perform at least one write command to a secondary storage node of the plurality of secondary storage nodes; and
        perform at least one backup command, at least partially in parallel with the at least one write command being performed to the secondary storage node, of at least some data from a snapshot of data stored in the secondary storage node,
    wherein the replica set is configured to store at least one dataset in the database, wherein the at least one backup command is performed without allocating additional disk capacity beyond that in the replica set, wherein each backup command of the at least one backup command opens no more than one backup cursor, wherein storage resources of the backup cursor are released based on whether a heartbeat signal is received within a time interval.

2. The database system of claim 1, wherein the at least one backup command is performed without allocating additional hardware beyond that in the plurality of data storage nodes.

3. The database system of claim 1, wherein the at least one processor is configured to validate whether a storage engine supports the at least one backup command.

4. The database system of claim 1, wherein the database system includes first components that support the at least one backup command and second components that do not support the at least one backup command.

5. The database system of claim 1, wherein the database follows an eventual consistency model.

6. The database system of claim 1, wherein the at least one processor is configured to execute a plurality of system components, wherein the system components comprise:

an interface component configured to receive the at least one write command and the at least one backup command;

a snapshot component configured to generate a plurality of snapshots of data stored in the secondary storage node; and a command processing component configured to apply the at least one write command and perform the at least one backup command.

7. A method for performing at least one backup command in a database comprising a plurality of data storage nodes, the plurality of data storage nodes forming a replica set, the plurality of data storage nodes including, in the replica set, a primary storage node and a plurality of secondary storage nodes, the method comprising:

performing at least one write command to a secondary storage node of the plurality of secondary storage nodes; and performing at least one backup command, at least partially in parallel with the at least one write command being performed to the secondary storage node, of at least some data from a snapshot of data stored in the secondary storage node, wherein the replica set is configured to store at least one dataset in the database, wherein the at least one backup command is performed without allocating additional disk capacity beyond that in the replica set, wherein each backup command of the at least one backup command opens no more than one backup cursor, wherein storage resources of the backup cursor are released based on whether a heartbeat signal is received within a time interval.

8. At least one computer-readable storage medium having instructions recorded thereon which, when executed by a computer, cause the computer to perform a method for performing at least one backup command in a database comprising a plurality of data storage nodes, the plurality of data storage nodes forming a replica set, the plurality of data storage nodes including, in the replica set, a primary storage node and a plurality of secondary storage nodes, the method comprising:

performing at least one write command to a secondary storage node of the plurality of secondary storage nodes; and performing at least one backup command, at least partially in parallel with the at least one write command being performed to the secondary storage node, of at least some data from a snapshot of data stored in the secondary storage node, wherein the replica set is configured to store at least one dataset in the database, wherein the at least one backup command is performed without allocating additional disk capacity beyond that in the replica set, wherein each backup command of the at least one backup command opens no more than one backup cursor, wherein storage resources of the backup cursor are released based on whether a heartbeat signal is received within a time interval.

9. The at least one computer-readable storage medium of claim 8, wherein the at least one backup command is performed without allocating additional hardware beyond that in the plurality of data storage nodes.

10. The at least one computer-readable storage medium of claim 8, wherein the method further comprises validating whether a storage engine supports the at least one backup command.

11. The at least one computer-readable storage medium of claim 8, wherein the database system includes first components that support the at least one backup command and second components that do not support the at least one backup command.

12. The at least one computer-readable storage medium of claim 8, wherein the database follows an eventual consistency model.

* * * * *

UNITED STATES PATENT AND TRADEMARK OFFICE
CERTIFICATE OF CORRECTION

| | | |
|---|---|---|
| PATENT NO. | : 11,829,253 B2 | |
| APPLICATION NO. | : 16/895601 | |
| DATED | : November 28, 2023 | |
| INVENTOR(S) | : Alyson Cabral et al. | |

It is certified that error appears in the above-identified patent and that said Letters Patent is hereby corrected as shown below:

On the Title Page

Item (71) Applicants should read: MongoDB, Inc.

Signed and Sealed this
Twenty-sixth Day of March, 2024

Katherine Kelly Vidal
*Director of the United States Patent and Trademark Office*